（12） United States Patent
Tseng et al.

(10) Patent No.: US 12,001,079 B2
(45) Date of Patent: Jun. 4, 2024

(54) OPTICAL CAMERA LENS

(71) Applicants: SINTAI OPTICAL (SHENZHEN) CO., LTD., Guandong (CN); ASIA OPTICAL CO., INC., Taichung (TW)

(72) Inventors: Ming-Huang Tseng, Taichung (TW); Guo-Yang Wu, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 297 days.

(21) Appl. No.: 17/186,124

(22) Filed: Feb. 26, 2021

(65) Prior Publication Data
US 2021/0278633 A1    Sep. 9, 2021

(30) Foreign Application Priority Data

Mar. 5, 2020   (TW) .................................. 109107271
May 11, 2020   (CN) ......................... 202010392964.0

(51) Int. Cl.
*G02B 9/14*      (2006.01)
*G02B 9/34*      (2006.01)
*G02B 13/00*     (2006.01)

(52) U.S. Cl.
CPC ................. *G02B 9/14* (2013.01); *G02B 9/34* (2013.01); *G02B 13/0035* (2013.01); *G02B 13/004* (2013.01); *G02B 13/0065* (2013.01)

(58) Field of Classification Search
CPC ........ G02B 9/14; G02B 9/34; G02B 13/0035; G02B 13/004; G02B 13/0065
See application file for complete search history.

(56) References Cited

U.S. PATENT DOCUMENTS 2,194,413 A *   3/1940   Warmisham ........... G02B 13/00
                                                      359/778
2,936,675 A *   5/1960   Schade .................. G02B 13/00
                                                      359/778
(Continued)

FOREIGN PATENT DOCUMENTS

CN        104423030 A       3/2015
CN        208683247 U       4/2019
(Continued)

OTHER PUBLICATIONS

Chinese language office action dated Mar. 31, 2022, issued in application No. CN 202010392964.0.

*Primary Examiner* — George G. King
(74) *Attorney, Agent, or Firm* — McClure, Qualey & Rodack, LLP

(57) ABSTRACT

An optical camera lens including a first lens, a second lens, and a third lens arranged in sequence from the object side to the image side. The first lens has a positive refractive power, and includes a first object side surface and a first image side surface opposite to the first object side surface. The second lens has a negative refractive power, and includes a second object side surface and a second image side surface opposite to the second object side surface, wherein the second image side surface is concave. The third lens has a positive refractive power, and includes a third object side surface and a third image side surface opposite to the third object side surface, wherein both the third object side surface and the third image side surface are convex. The optical camera lens satisfies the following condition: 2<(f+BFL)/OD1<7.

13 Claims, 18 Drawing Sheets

(56) References Cited

U.S. PATENT DOCUMENTS

| | | | | |
|---|---|---|---|---|
| 3,652,151 | A * | 3/1972 | Kawabe | G02B 13/00 359/778 |
| 6,101,035 | A * | 8/2000 | Maruyama | G02B 9/14 359/570 |
| 6,466,377 | B1 * | 10/2002 | Saito | G02B 13/0035 359/716 |
| 6,560,043 | B1 * | 5/2003 | Saito | G02B 9/12 359/740 |
| 7,548,384 | B1 * | 6/2009 | Liang | G02B 13/004 359/772 |
| 9,151,934 | B2 | 10/2015 | Saito et al. | |
| 9,551,864 | B2 | 1/2017 | Kawamura | |
| 11,360,290 | B2 | 6/2022 | Lin et al. | |
| 2007/0146902 | A1 * | 6/2007 | Li | G02B 13/0035 359/785 |
| 2014/0254031 | A1 * | 9/2014 | Liao | G02B 9/34 359/715 |
| 2014/0285908 | A1 * | 9/2014 | Hsu | G02B 13/004 359/715 |
| 2018/0321468 | A1 * | 11/2018 | Shih | G02B 9/50 |
| 2020/0166732 | A1 * | 5/2020 | Lin | G02B 9/16 |
| 2021/0103124 | A1 * | 4/2021 | Chen | G02B 13/0065 |

FOREIGN PATENT DOCUMENTS

| | | | | |
|---|---|---|---|---|
| CN | 208689247 U | * | 4/2019 | |
| CN | 210323553 U | | 4/2020 | |
| JP | 2001-124986 A | | 5/2001 | |
| JP | 2017-053887 A | | 3/2017 | |
| TW | I680322 B | | 12/2019 | |
| TW | I690724 B | | 4/2020 | |
| TW | I719659 B | * | 2/2021 | ......... G02B 13/0035 |

* cited by examiner

OPTICAL CAMERA LENS

CROSS REFERENCE TO RELATED APPLICATIONS

This application claims the benefit of Taiwan Patent Application No. 109107271, filed Mar. 5, 2020, and China Patent Application No. 202010392964.0, filed May 11, 2020, the entirety of which are incorporated by reference herein.

BACKGROUND OF THE INVENTION

Field of the Invention

The application relates in general to a camera lens, and in particular, to an optical camera lens configured to form an image.

Description of the Related Art

Nowadays, the trends in the development of lens assemblies are toward continuous miniaturization and high resolution. However, a conventional camera lens cannot satisfy such requirements. Therefore, a camera lens needs a new structure in order to meet the requirements of miniaturization and high resolution at the same time.

BRIEF SUMMARY OF INVENTION

An embodiment of the invention provides an optical camera lens, including a first lens, a second lens, and a third lens arranged in sequence from the object side to the image side. The first lens is a meniscus lens with positive refractive power, and includes a first object side surface and a first image side surface opposite to the first object side surface. The second lens is with negative refractive power, and includes a second object side surface and a second image side surface opposite to the second object side surface, wherein the second image side surface is concave. The third lens is with positive refractive power, and includes a third object side surface and a third image side surface opposite to the third object side surface, wherein both the third object side surface and the third image side surface are convex. The optical camera lens satisfies the following condition: $0<f1/BFL<4.5$ or $2<(f+BFL)/OD1<7$, wherein f is the effective focal length of the optical camera lens, f1 is the effective focal length of the first lens, BFL is the back focal length of the optical camera lens, and OD1 is the effective diameter of the first lens at the object side.

In some embodiments, the first object side surface is convex, the first image side surface is concave, and the second object side surface is convex.

In some embodiments, the optical camera lens further includes a fourth lens disposed between the third lens and the image side. The fourth lens is a meniscus lens with negative refractive power and includes a fourth object side surface and a fourth image side surface, and the fourth object side surface is opposite to the fourth image side surface. The first object side surface is concave and the first image side surface is convex. The second object side surface is concave. The fourth object side surface is convex and the fourth image side surface is concave.

In some embodiments, the optical camera lens satisfies the following condition: $1<(TTL+f)/f1<5$, wherein TTL is the total length of the optical camera lens.

In some embodiments, the optical camera lens satisfies at least one of the following conditions: $-3.5<f/f2<0$ and $16\ mm<f1+f2<21\ mm$, wherein f2 is the effective focal length of the second lens.

In some embodiments, the optical camera lens satisfies the following condition: $2.5<R21/R22<3$, wherein R21 is the radius of curvature of the second object side surface and R22 is the radius of curvature of the second image side surface.

In some embodiments, the optical camera lens satisfies the following conditions: $0<TTL/BFL<2$.

In some embodiments, the optical camera lens satisfies the following condition: $6<BFL/T1<11$, wherein T1 is the thickness of the first lens.

In some embodiments, the optical camera lens satisfies the following condition: $1<BFL/OD3<5$, wherein OD3 is the effective diameter of the third lens at the object side.

In some embodiments, the optical camera lens satisfies the following conditions: $3.5<BFL/AAG<5.5$, wherein AAG is the sum of the air gap between the first lens and the second lens and the air gap between the second lens and the third lens.

In some embodiments, the optical camera lens satisfies the following conditions: $1<f/ALOD<2.3$, wherein ALOD is the sum of the effective diameter of the first lens at the object side, the effective diameter of the second lens at the object side, and the effective diameter of the third lens at the object side.

In some embodiments, the optical camera lens satisfies at least one of the following conditions: $-1<f3/f4<2$, $0.2\ mm^2<T1*L1SD<2.2\ mm^2$, $-4\ mm^2<T1*R11<0\ mm^2$, and $1<f1/T1<4$, wherein f3 is the effective focal length of the third lens, f4 is the effective focal length of the fourth lens, L1SD is the optical effective radius of the first image side surface, R11 is the radius of curvature of the first object side surface, and f1 is the effective focal length of the first lens.

In some embodiments, the optical camera lens further includes a first light path adjusting member and a second light path adjusting member. The first light path adjusting member is disposed between the first lens and image side, and the second light path adjusting member is disposed between the object side and the first lens. For example, the first light path adjusting member can be a prism or reflective mirror, and the second light path adjusting member can be a prism or reflective mirror.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF INVENTION

Figure 1:
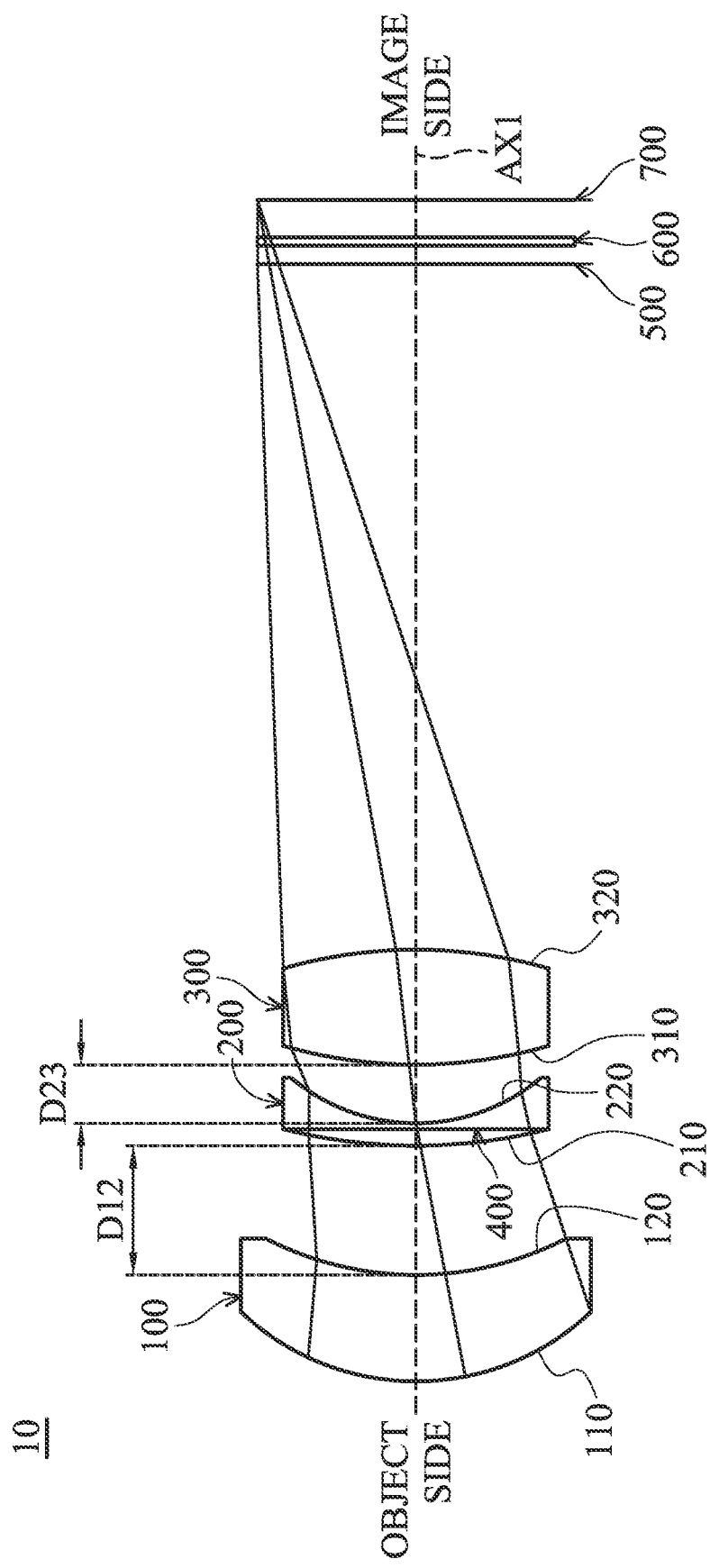
FIG. 1 is a schematic diagram of an optical camera lens according to a first embodiment of the invention.

The making and using of the embodiments of the optical camera lens are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

An optical camera lens is provided, including a first lens, a second lens, and a third lens arranged in sequence from the object side to the image side along the optical axis. The first lens is a meniscus lens with positive refractive power and includes a first object side surface facing the object side and a first image side surface facing the image side. The second lens is with negative refractive power and includes a second object side surface facing the object side and a second image side surface facing the image side, wherein the second image side surface is concave. The third lens is with positive refractive power and includes a third object side surface facing the object side and a third image side surface facing the image side, wherein the third object side surface is convex, and the third image side surface is convex. In some embodiments, the optical camera lens satisfies the following conditions: $0<f1/BFL<4.5$, wherein f1 is the effective focal length of the first lens and BFL is the back focal length of the optical camera lens. In some embodiments, the optical camera lens satisfies the following conditions: $2<(f+BFL)/OD1<7$, wherein OD1 is the effective diameter of the first lens at the object side.

Moreover, the optical camera lens can satisfy at least one of the following conditions to enhance the pixel resolution quality, and achieve the purpose of convenient processing.

$-3.5 < f/f2 < 0$ (1)

$2.5 < R21/R22 < 3$ (2)

$0 < TTL/BFL < 2$ (3)

$16\ mm < f1+f2 < 21\ mm$ (4)

$3.5 < BFL/AAG < 5.5$ (5)

$6 < BFL/T1 < 11$ (6)

$1 < f/ALOD < 2.3$ (7)

$1 < BFL/OD3 < 5$ (8)

$2 < (f+BFL)/OD1 < 7$ (9)

$0 < f1/BFL < 4.5$ (10)

$1 < (TTL+f)/f1 < 5$ (11)

$-1 < f3/f4 < 2$ (12)

$0.2\ mm^2 < T1*L1SD < 2.2\ mm^2$ (13)

$-4\ mm^2 < T1*R11 < 0\ mm^2$ (14)

$1 < f1/T1 < 4$ (15)

In the aforementioned conditions, f is the effective focal length of the optical camera lens 10 in the first, second, third, fourth, or fifth embodiment, TTL is the total length of the optical camera lens 10 in the first, second, third, fourth, or fifth embodiment (i.e. the distance between the object side surface of the first lens 100 and the imaging surface of the image sensor 700 along the optical axis AX1), and BFL is the back focal length of the optical camera lens 10 in the first, second, third, fourth, or fifth embodiment (i.e. the distance between the image side surface of the lens which closest to the image side and the imaging surface of the image sensor 700 along the optical axis AX1). f1 is the effective focal length of the first lens 100 in the first, second, third, fourth, or fifth embodiment. OD1 is the effective diameter of the first lens 100 in the first, second, third, fourth, or fifth embodiment at the object side. T1 is the thickness of the first lens 100 in the first, second, third, fourth, or fifth embodiment along the optical axis AX1. L1SD is the optical effective radius of the first image side surface 120 of the first lens 100 in the first, second, third, fourth, or fifth embodiment. f2 is the effective focal length of the second lens 200 in the first, second, third, fourth, or fifth embodiment. f3 is the effective focal length of the third lens 300 in the first, second, third, fourth, or fifth embodiment. OD3 is the effective diameter of the third lens 300 in the first, second, third, fourth, or fifth embodiment at the object side. f4 is the effective focal length of the fourth lens 800 in the fourth or fifth embodiment. ALOD is the sum of the effective diameter at the object side of each lens in the first, second, third, fourth, or fifth embodiment. R11 is the radius of curvature of the first object side surface 110 of the first lens 100 in the first, second, third, fourth, or fifth embodiment. R21 is the radius of curvature of the second object side surface 210 of the second lens 200 in the first, second, third, fourth, or fifth embodiment. R22 is the radius of curvature of the second image side surface 220 of the second lens 200 in the first, second, third, fourth, or fifth embodiment. AAG is the sum of the air gaps between the lenses, in other words, is the sum of the air gap D12 between the first lens 100 and the second lens 200 and the air gap D23 between the second lens 200 and the third lens 300.

It should be noted that, "1<BFL/OD3<5" in formula (8) is the ratio of BFL (back focal length) and the effective diameter of the third lens 300, and "2<(f+BFL)/OD1<7" in formula (9) is the ratio of the sum of the effective focal length f of the optical camera lens 10 and BFL (back focal length) and the effective diameter of the first lens 100 at the object side. Both of these two conditions include BFL (back focal length), which is one of the important factors affecting the zoom ratio. When the aforementioned conditions are satisfied, the back focal length can be increased, the higher zoom ratio can be achieved, and the miniaturization of the optical camera lens 10 can be also achieved by maintaining the dimensions of the camera lens module. Moreover, the sensitivity of the optical system can be reduced.

FIG. 1 is a schematic diagram of an optical camera lens 10 according to a first embodiment of the invention. As shown in FIG. 1, the optical camera lens 10 includes a first lens 100, an aperture 400, a second lens 200, a third lens 300, a light path adjusting member 500, a filter 600, and an image sensor 700 from the object side to the image side along the optical axis AX1 in sequence. The first lens 100, the second lens 200, the third lens 300, and the aperture 400 are adjacent to the object side. The second lens 200 and the aperture 400 are disposed between the first lens 100 and the third lens 300, and the second lens 200 is disposed between the aperture 400 and the third lens 300. The light path adjusting member 500, the filter 600, and the image sensor 700 are adjacent to the image side, and the filter 600 is disposed between the light path adjusting member 500 and the image sensor 700. The light path adjusting member 500 can be a prism or a reflecting mirror, and can change the moving direction of the light. The light path adjusting member 500 has a reflecting surface, and the reflecting surface has a metal layer. For example, the metal layer can be formed by coating an aluminum layer, but it is not limited thereto. The manufacturing method of the metal layer is not limited. The light from the object side can pass the first lens 100, the second lens 200, the third lens 300, the light path adjusting member 500, and the filter 600 in sequence and reach the image sensor 700, and form an image on the image sensor 700.

The first lens 100 is a meniscus lens with a positive refractive power that includes a first object side surface 110 facing the object side and a first image side surface 120 facing the image side. The first object side surface 110 is convex, and the first image side surface 120 is concave. The first lens 100 may be made of glass or plastic material.

The second lens 200 is a meniscus lens with a negative refractive power that includes a second object side surface 210 facing the object side and a second image side surface 220 facing the image side. The second object side surface 210 is convex, and the second image side surface 220 is concave. The second lens 200 may be made of glass or plastic material.

The third lens 300 is a biconvex lens with a positive refractive power that includes a third object side surface 310 facing the object side and a third image side surface 320 facing the image side. The third object side surface 310 is convex, and the third image side surface 220 is convex too. Thus, the back focal length of the optical camera lens 10 can be increased. In this embodiment, the third lens 300 may be made of glass or plastic material.

Table 1 is the related parameters of the lenses of the optical camera lens 10 in FIG. 1.

TABLE 1

| Effective focal length = 30 mm Total length = 34.05 mm | | | | F-Number = 3.23 Field of view = 15.18 degree | | |
| --- | --- | --- | --- | --- | --- | --- |
| Surface number | Radius of curvature (mm) | Thickness (mm) | Refractive index | Focal length (mm) | Abbe number | Remarks |
| 110 | 6.995456 | 2.863921 | 1.521430 | 29.483 | 70.13 | first lens 100 |
| 120 | 11.03531 | 3.814025 | | | | |
| | ∞ | −0.3672631 | | | | aperture 400 |
| 210 | 12.1052 | 0.5889545 | 1.717930 | −10.331 | 29.60 | second lens 200 |
| 220 | 4.505652 | 1.591948 | | | | |
| 310 | 12.83062 | 2.840325 | 1.799030 | 11.401 | 45.55 | third lens 300 |
| 320 | −28.32651 | 21 | | | | |
| | ∞ | 0 | 1.740005 | | 28.29 | light path adjusting member 500 |
| | ∞ | 0.5 | | | | |
| | ∞ | 0.21 | 1.5168 | | 64.16 | filter 600 |
| | ∞ | 1.014788 | | | | |

In this embodiment, the optical camera lens 10 can meet at least one of the aforementioned formulas (1)-(11), so as to increase the pixel resolution quality of the optical camera lens and achieve the purpose of convenient processing. Especially when the optical camera lens 10 applied in the electronic device, such as the movable terminal device, the cellphone, or the tablet computer, it can increase the back focal length of the optical camera lens without increasing the dimensions, the volume, and the thickness of the camera lens, and the optical camera lens 10 can include high magnification optical zoom. In the first embodiment, the effective focal length f is 30 mm, and the effective focal length f2 of the second lens 200 is −10.331 mm. Therefore, f/f2 in formula (1) is −2.903.

The radius of curvature of the second object side surface 210 is 12.1052 mm, and the radius of curvature of the second image side surface 220 is 4.505652 mm. Therefore, R21/R22 in formula (2) is 2.686.

The total length of the optical camera lens 10 is 34.05 mm, and the back focal length of the optical camera lens 10 is 22.72 mm. Therefore, TTL/BFL in formula (3) is 1.498.

The effective focal length f1 of the first lens 100 is 29.483 mm, and the effective focal length f2 of the second lens 200 is −10.331 mm. Therefore, f1+f2 in formula (4) is 19.152 mm.

The back focal length of the optical camera lens 10 is 22.72 mm, the air gap D12 between the first image side surface 120 of the first lens 100 and the second object side surface 210 of the second lens 200 along the optical axis AX1 is 3.814 mm, and the air gap D23 between the second image side surface 220 of the second lens 200 and the third object side surface 310 of the third lens 300 along the optical axis AX1 is 1.592 mm. AAG is 5.406 mm. Therefore, BFL/AAG in formula (5) is 4.202.

The back focal length of the optical camera lens 10 is 22.72 mm, and the thickness of the first lens 100 in the optical axis AX1 is 2.864 mm. Therefore, BFL/T1 in formula (6) is 7.932.

The effective focal length f is 30 mm, the effective diameter of the first lens 100 at the object side is 9.34 mm, the effective diameter of the second lens 200 at the object side is 7.121 mm, and the effective diameter of the third lens 300 at the object side is 7.123 mm. Therefore, f/ALOD in formula (7) is 1.272.

The back focal length of the optical camera lens 10 is 22.72 mm, and the effective diameter of the third lens 300 at the object side is 7.123 mm. Therefore, BFL/OD3 in formula (8) is 3.189.

The effective focal length f is 30 mm, the back focal length of the optical camera lens is 22.72 mm, and the effective diameter of the first lens 100 at the object side is 9.34 mm. Therefore, (f+BFL)/OD1 in formula (9) is 5.644.

The effective focal length f1 of the first lens 100 is 29.483 mm, and the back focal length of the optical camera lens 10 is 22.72 mm. Therefore, f1/BFL in formula (10) is 1.297.

The total length of the optical camera lens 10 is 34.05 mm, the effective focal length f is 30 mm, and the effective focal length f1 of the first lens 100 is 29.483 mm. Therefore, (TTL+f)/f1 in formula (11) is 2.172.

The aspheric surface sag z of each of each aspheric lens in Table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}.$$

In the aforementioned formula, c is curvature, h is the vertical distance from the lens surface to the optical axis AX1, and k is conic constant. A, B, C, D, E, F and G are aspheric coefficients.

Table 2 is the related parameters about aspheric coefficients of each aspheric surface of each of the lenses in Table 1.

It should be noted that, in this embodiment, the second lens 200 overlaps the aperture 400 as seen from a direction perpendicular to the optical axis AX1. In other words, the second lens 200 passes through the aperture 400. The distance between at least a portion of the second object side surface 210 and the first lens 100 is less than the distance between the aperture 400 and the first lens 100. In this embodiment, in the optical axis AX1, the distance between at least a portion of the second object side surface 210 and the first lens 100 is 0.3672631 mm smaller than the distance between the aperture 400 and the first lens 100.

Figure 2A:
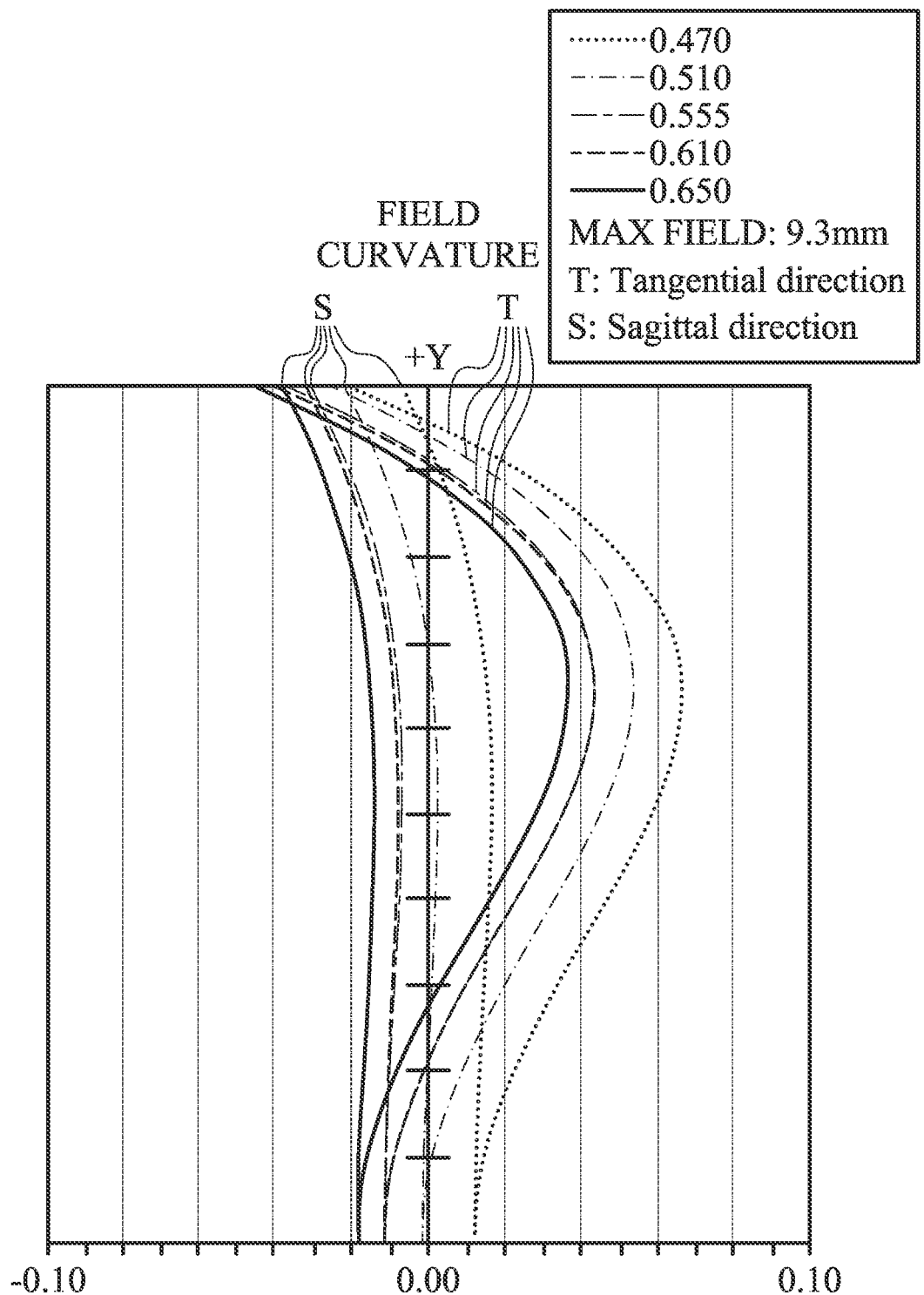
FIG. 2A is a field curvature diagram of the optical camera lens in the first embodiment.
Figure 2B:
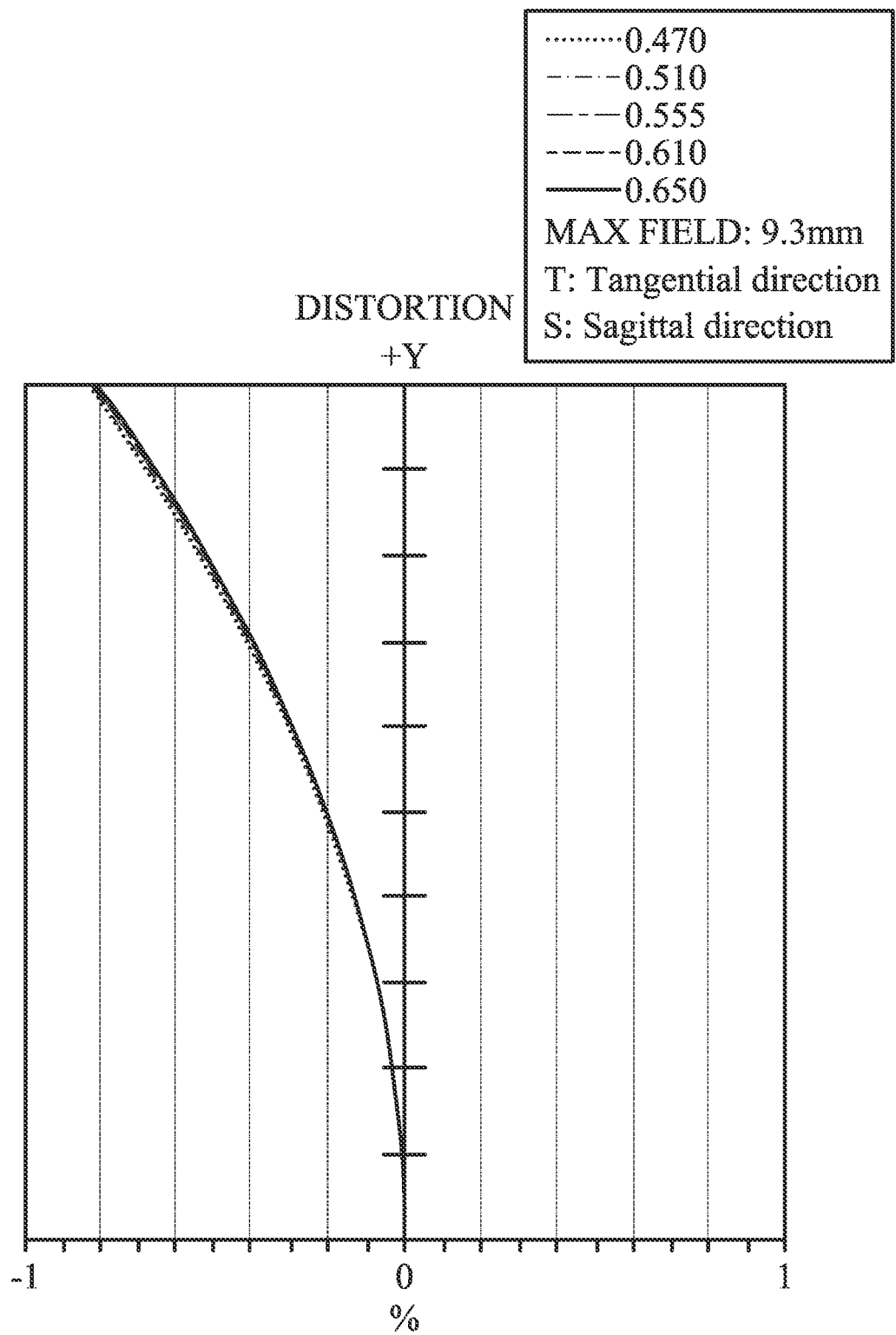
FIG. 2B is a distortion diagram of the optical camera lens in the first embodiment.
Figure 2C:
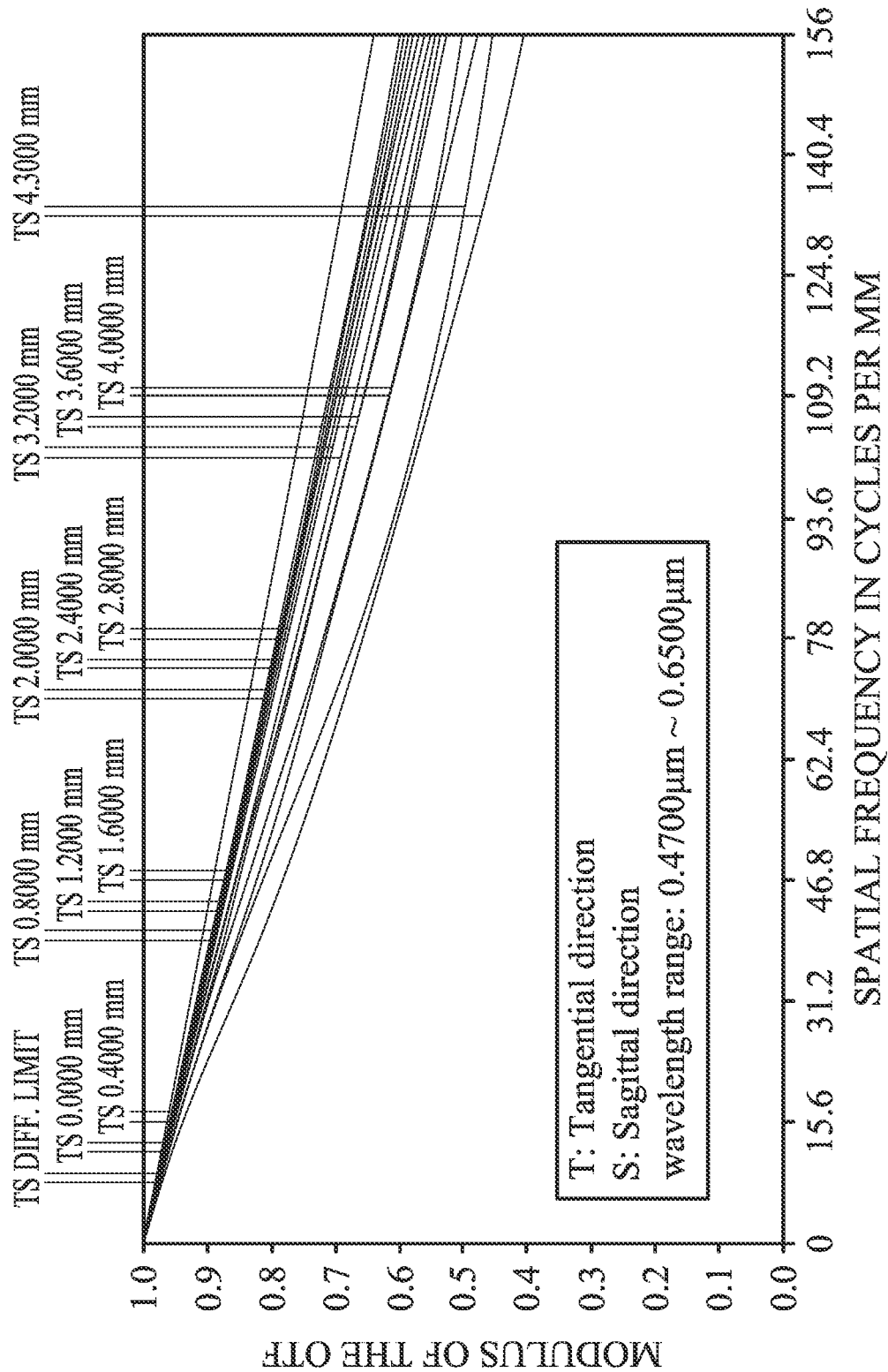
FIG. 2C is a modulation transfer function diagram of the optical camera lens in the first embodiment.

FIG. 2A is a field curvature diagram of the optical camera lens 10 in the first embodiment. As shown in FIG. 2A, the field curvature of the tangential direction and the sagittal direction in the optical camera lens 10 in the first embodiment ranges from −0.045 mm to 0.070 mm. FIG. 2B is a distortion diagram of the optical camera lens 10 in the first embodiment. As shown in FIG. 2B, the distortion in the optical camera lens 10 in the first embodiment ranges from −0.9% to 0%. FIG. 2C is a modulation transfer function diagram of the optical camera lens in the first embodiment. As shown in FIG. 2C, the spatial frequency in the optical camera lens in the first embodiment ranges from 0 lp/mm to 156 lp/mm, and the modulation transfer function in the optical camera lens 10 in the first embodiment ranges from 0.4 to 1.0.

Therefore, in this embodiment, the field curvature and the distortion in the optical camera lens 10 can be effectively corrected, and the requirement of the camera lens resolution can be met, so that the high optical performance can be obtained.

In some embodiments, the components in the optical camera lens 10 can be added or omitted as required in the condition without changing the optical characteristic of the optical camera lens 10. For example, in some embodiments, the filter 600 in the optical camera lens 10 can be omitted as required. In some embodiments, an additional light path adjusting member can be added at the position between the object side and the first lens 100 to increase the focal length of the whole system. The optical camera lens 10 can achieve a periscope structure by the additional light path adjusting member, so that the dimensions, the volume, and the thickness of the camera lens module can be controlled and miniaturized. The light from the object side passes through the additional light path adjusting member, the first lens, the second lens, the third lens, the light path adjusting member, and the filter in sequence, and reaches the image sensor. In some embodiments, an additional light path adjusting member can be added at the position between the lenses. The light

TABLE 2

| Surface number | k | A | B | C | D |
|---|---|---|---|---|---|
| | | E | F | G | |
| 110 | −0.05409074 | $2.5446935 \times 10^{-5}$ | $1.702513 \times 10^{-5}$ | $-5.2133142 \times 10^{-7}$ | $-5.5240163 \times 10^{-10}$ |
| | | $3.9280691 \times 10^{-11}$ | $3.1675023 \times 10^{-11}$ | $-1.0273623 \times 10^{-12}$ | |
| 120 | 4.071313 | 0.00014358471 | $3.9728829 \times 10^{-5}$ | $-1.9100864 \times 10^{-6}$ | $-1.0273308 \times 10^{-7}$ |
| | | $3.2324252 \times 10^{-9}$ | $3.3036113 \times 10^{-10}$ | $-1.6817908 \times 10^{-11}$ | |
| 210 | 8.66615 | −0.00035712993 | $-9.8972986 \times 10^{-5}$ | $5.8613369 \times 10^{-7}$ | $-6.8744095 \times 10^{-7}$ |
| | | $2.123368 \times 10^{-8}$ | $6.984846 \times 10^{-9}$ | $-4.326803 \times 10^{-10}$ | |
| 220 | 0.4578687 | −0.0011338023 | −0.00018954341 | $-2.0180321 \times 10^{-6}$ | $-1.3053045 \times 10^{-6}$ |
| | | $-3.5727854 \times 10^{-8}$ | $3.103258 \times 10^{-8}$ | $-1.8069798 \times 10^{-9}$ | |
| 310 | −3.211433 | $6.8427026 \times 10^{-5}$ | $-5.3974833 \times 10^{-6}$ | $-2.8300223 \times 10^{-7}$ | $-4.8659316 \times 10^{-7}$ |
| | | $1.4728172 \times 10^{-8}$ | $3.4846681 \times 10^{-9}$ | $-1.4979773 \times 10^{-10}$ | |
| 320 | −20.95696 | −0.0005487046 | $1.125759 \times 10^{-5}$ | $-3.1685544 \times 10^{-6}$ | $5.7466399 \times 10^{-8}$ |
| | | $9.0586451 \times 10^{-9}$ | $-4.3459786 \times 10^{-10}$ | $1.0157353 \times 10^{-11}$ | | from the object side passes through the lens closest to the object side, the additional light path adjusting member, the lens closest to the image side, the light path adjusting member, and the filter in sequence, and reaches the image sensor.

Figure 3:
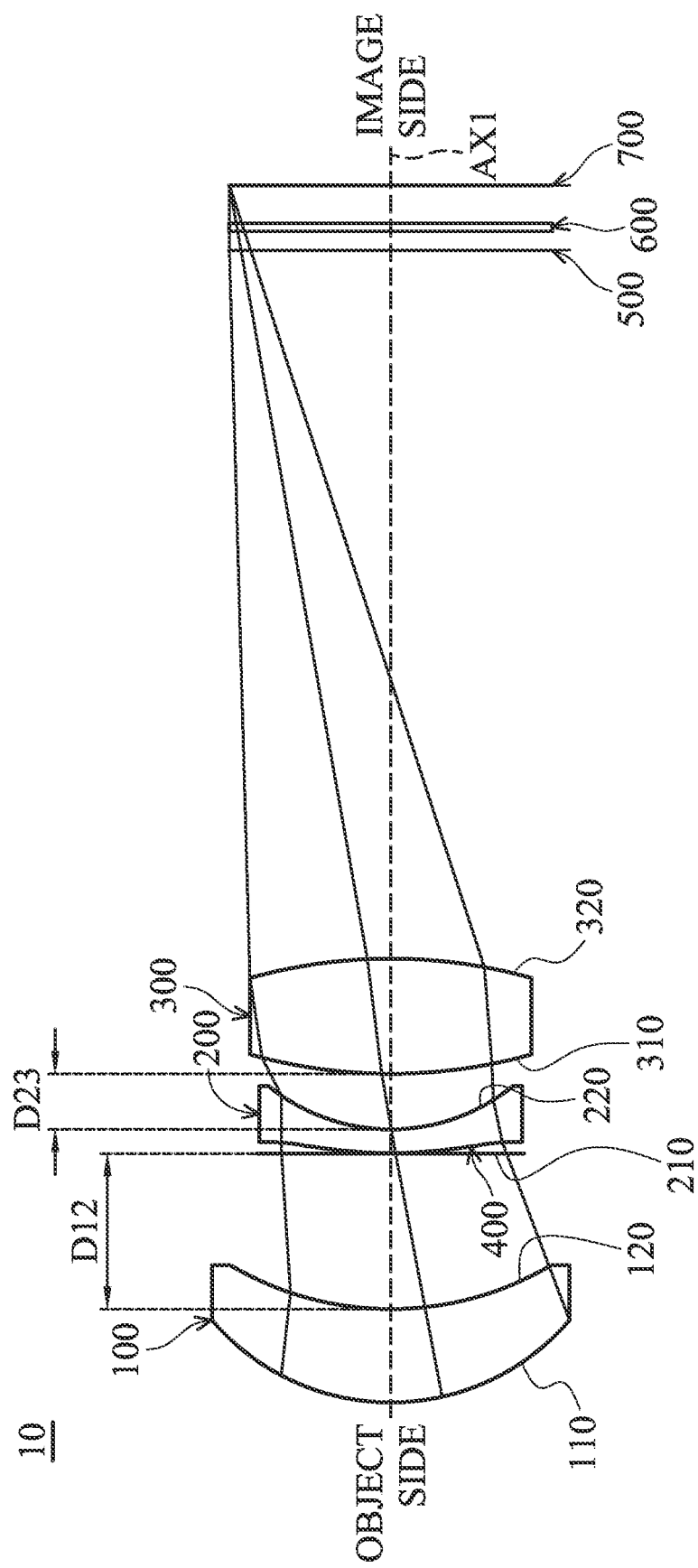
FIG. 3 is a schematic diagram of an optical camera lens according to a second embodiment of the invention.

FIG. 3 is a schematic diagram of an optical camera lens 10 according to a second embodiment of the invention. Referring to FIG. 3, the optical camera lens 10 includes a first lens 100, an aperture 400, a second lens 200, a third lens 300, a light path adjusting member 500, a filter 600, and an image sensor 700 from the object side to the image side along the optical axis AX1 in sequence. The light from the object side can pass the first lens 100, the second lens 200, the third lens 300, the light path adjusting member 500, and the filter 600 in sequence and reach the image sensor 700, and form an image on the image sensor 700. In the second embodiment, the first lens 100, the second lens 200, and the third lens 300 have a positive refractive power, a negative refractive power, and a positive refractive power, respectively. The shapes of the first lens 100, the second lens 200 and the third lens 300 in the second embodiment is similar to those in the first embodiment, and the description of the features thereof are not repeated in the interest of brevity. Table 3 shows the related parameters of the lenses of the optical camera lens 10 in FIG. 3.

In this embodiment, the optical camera lens 10 can meet at least one of the aforementioned formulas (1)-(11), so as to increase the pixel resolution quality of the optical camera lens and achieve the purpose of convenient processing. Especially when the optical camera lens 10 applied in the electronic device, such as the movable terminal device, the cellphone, or the tablet computer, it can increase the back focal length of the optical camera lens without increasing the dimensions, the volume, and the thickness of the camera lens, and the optical camera lens 10 can include high magnification optical zoom.

In the second embodiment, the effective focal length f is 29.92 mm, and the effective focal length f2 of the second lens 200 is −10.243 mm. Therefore, f/f2 in formula (1) is −2.920.

The radius of curvature of the second object side surface 210 is 11.69079 mm, and the radius of curvature of the second image side surface 220 is 4.405977 mm. Therefore, R21/R22 in formula (2) is 2.653.

The total length of the optical camera lens 10 is 34.21 mm, and the back focal length of the optical camera lens 10 is 22.72 mm. Therefore, TTL/BFL in formula (3) is 1.505.

The effective focal length f1 of the first lens 100 is 28.833 mm, and the effective focal length f2 of the second lens 200 is −10.243 mm. Therefore, f1+f2 in formula (4) is 18.590 mm.

TABLE 3

| Effective focal length = 29.92 mm | | F-Number = 3.23 | | | | |
| Total length = 34.21 mm | | Field of view = 15.20 degree | | | | |

| Surface number | Radius of curvature (mm) | Thickness (mm) | Refractive index | Focal length (mm) | Abbe number | Remarks |
|---|---|---|---|---|---|---|
| 110 | 6.45032 | 2.3681 | 1.517708 | 28.833 | 70.06 | first lens |
| 120 | 9.935929 | 4.109691 | | | | 100 |
| | ∞ | −0.02973503 | | | | aperture 400 |
| 210 | 11.69079 | 0.5889545 | 1.714355 | −10.243 | 29.66 | second lens |
| 220 | 4.405977 | 1.611656 | | | | 200 |
| 310 | 15.78955 | 2.840325 | 1.799963 | 11.513 | 45.22 | third lens |
| 320 | −20.33537 | 21 | | | | 300 |
| | ∞ | 0 | 1.740005 | | 28.29 | light path adjusting member 500 |
| | ∞ | 0.5 | | | | |
| | ∞ | 0.21 | 1.5168 | | 64.16 | filter 600 |
| | ∞ | 1.014788 | | | | |

Table 4 is the related parameters about aspheric coefficients of each aspheric surface of each of the lenses in Table 3.

The back focal length of the optical camera lens 10 is 22.72 mm, the air gap D12 between the first image side surface 120 of the first lens 100 and the second object side

TABLE 4

| Surface number | k | A | B | C | D |
|---|---|---|---|---|---|
| | | E | F | G | |
| 110 | 0.02200047 | 0.00010204555 | 2.0226711e−005 | −6.1571925e−007 | −2.6342503e−009 |
| | | 6.3726655e−011 | 2.8121133e−011 | −1.1870023e−012 | |
| 120 | 3.314049 | 0.00025729824 | 3.4783389e−005 | −1.8341372e−006 | −1.205308e−007 |
| | | 1.2114168e−009 | 3.0332509e−010 | −1.3261793e−011 | |
| 210 | 8.467076 | −0.00038821987 | −0.00014727124 | −3.6663735e−006 | −8.4138819e−007 |
| | | 2.391422e−008 | 9.3775996e−009 | −5.4792337e−010 | |
| 220 | 0.4473572 | −0.00075729765 | −0.00022320749 | −9.3665393e−006 | −1.5394798e−006 |
| | | −8.3889314e−009 | 3.2010543e−008 | −1.9160688e−009 | |
| 310 | −4.702068 | 9.5564027e−005 | −1.2539693e−007 | 1.1585326e−006 | −4.5433559e−007 |
| | | 6.2276484e−009 | 2.3889611e−009 | −7.4037099e−011 | |
| 320 | −5.388079 | −0.00065945462 | 1.481536e−005 | −3.0817658e−006 | 1.0611118e−007 |
| | | 8.3632425e−009 | −9.7174273e−010 | 3.3265507e−011 | | surface 210 of the second lens 200 along the optical axis AX1 is 4.11 mm, and the air gap D23 between the second image side surface 220 of the second lens 200 and the third object side surface 310 of the third lens 300 along the optical axis AX1 is 1.612 mm. AAG is 5.722 mm. Therefore, BFL/AAG in formula (5) is 3.970.

The back focal length of the optical camera lens 10 is 22.72 mm, and the thickness of the first lens 100 in the optical axis AX1 is 2.368 mm. Therefore, BFL/T1 in formula (6) is 9.594.

The effective focal length f is 29.92 mm, the effective diameter of the first lens 100 at the object side is 9.34 mm, the effective diameter of the second lens 200 at the object side is 6.858 mm, and the effective diameter of the third lens 300 at the object side is 7.097 mm. Therefore, f/ALOD in formula (7) is 1.284.

The back focal length of the optical camera lens 10 is 22.72 mm, and the effective diameter of the third lens 300 at the object side is 7.097 mm. Therefore, BFL/OD3 in formula (8) is 3.201.

The effective focal length f is 29.92 mm, the back focal length of the optical camera lens 10 is 22.72 mm, and the effective diameter of the first lens 100 at the object side is 9.34 mm. Therefore, (f+BFL)/OD1 in formula (9) is 5.635.

The effective focal length f1 of the first lens 100 is 28.833 mm, and the back focal length of the optical camera lens 10 is 22.72 mm. Therefore, f1/BFL in formula (10) is 1.269.

The total length of the optical camera lens 10 is 34.21 mm, the effective focal length f is 29.92 mm, and the effective focal length f1 of the first lens 100 is 28.833 mm. Therefore, (TTL+f)/f1 in formula (11) is 2.224.

The aspheric surface sag z of each of the lenses in the optical camera lens 10 in the second embodiment is similar to that in the first embodiment, so that the features thereof are not repeated in the interest of brevity. Moreover, in the second embodiment, in the optical axis AX1, the distance between the second object side surface 210 and the first lens 100 is 0.02973503 mm smaller than the distance between the aperture 400 and the first lens 100. In some embodiments, the second lens 200 does not overlap the aperture 400 as seen from a direction perpendicular to the optical axis AX1, and the aperture 400 and the second object side surface 210 of the second lens 200 are tangent.

Figure 4A:
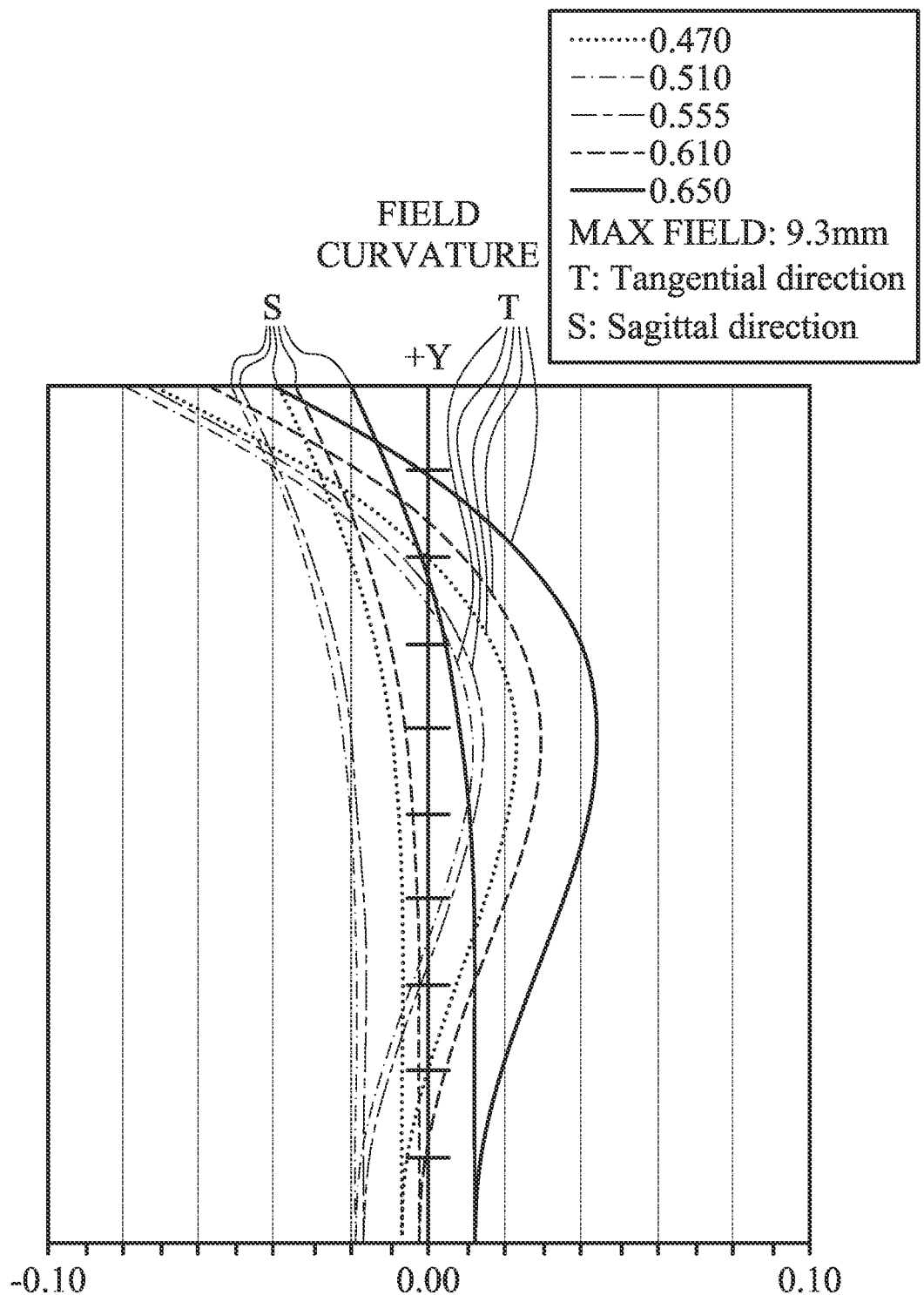
FIG. 4A is a field curvature diagram of the optical camera lens in the second embodiment.
Figure 4B:
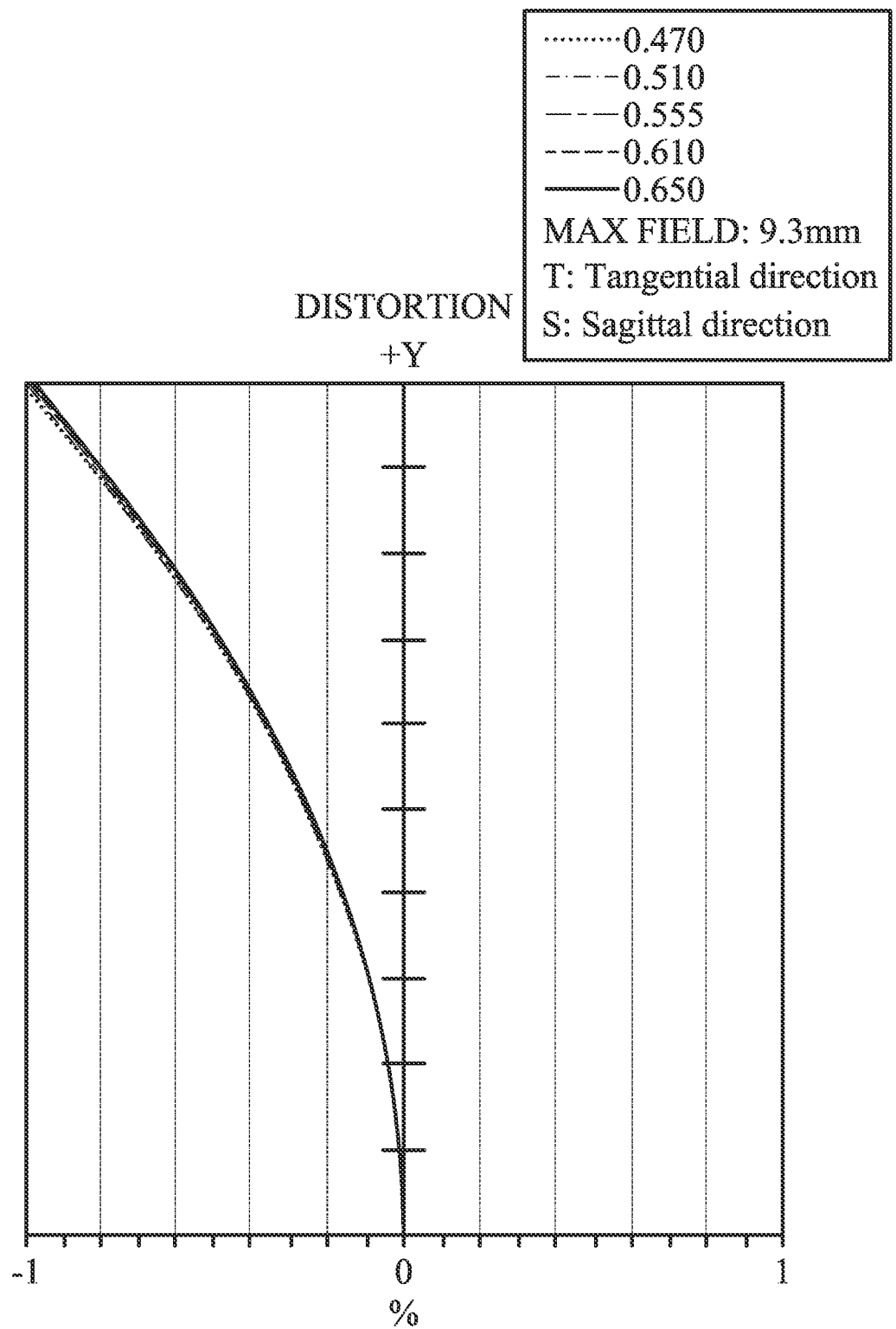
FIG. 4B is a distortion diagram of the optical camera lens in the second embodiment.
Figure 4C:
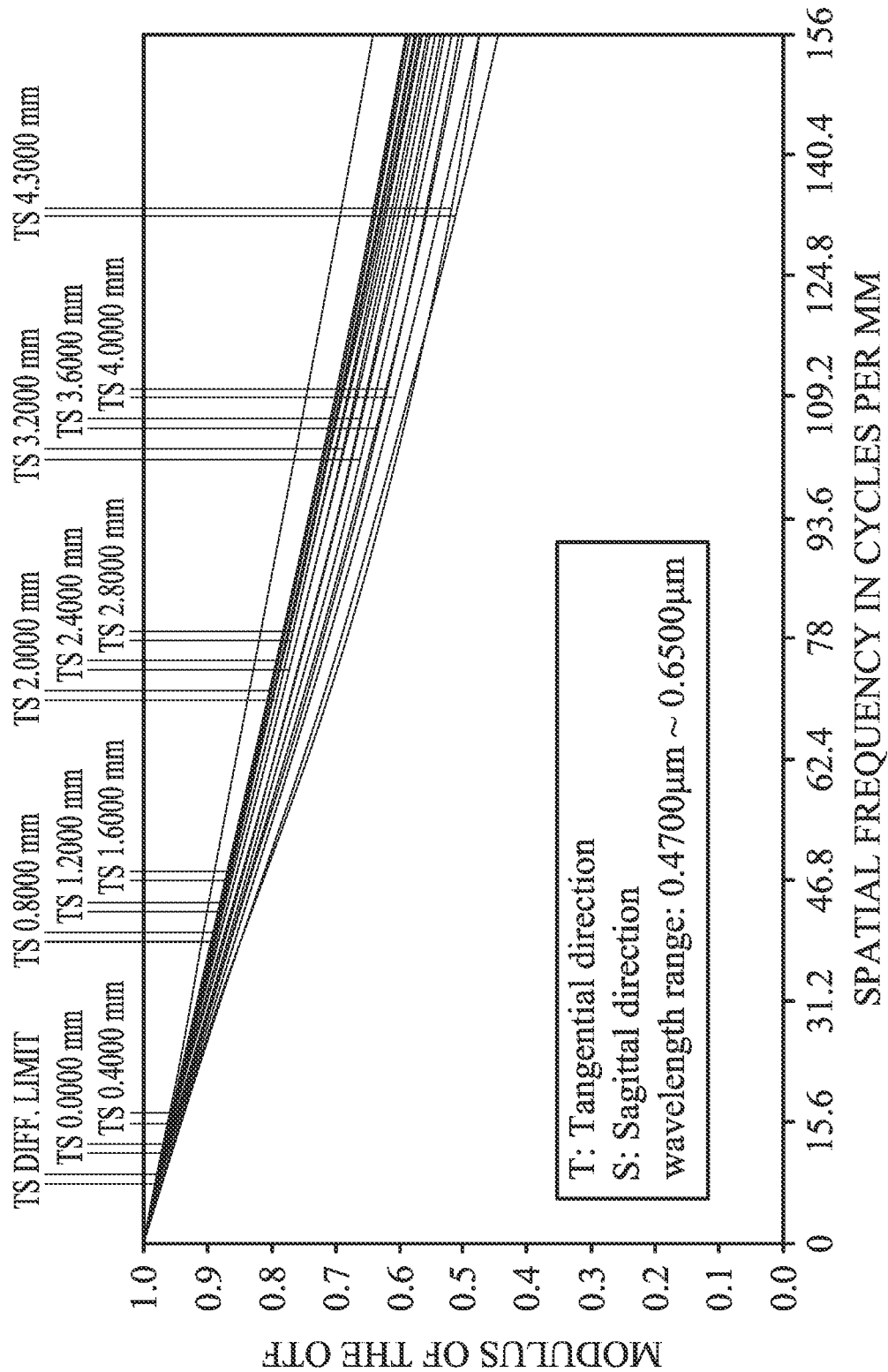
FIG. 4C is a modulation transfer function diagram of the optical camera lens in the second embodiment.

FIG. 4A is a field curvature diagram of the optical camera lens 10 in the second embodiment. As shown in FIG. 4A, the field curvature of the tangential direction and the sagittal direction in the optical camera lens 10 in the second embodiment ranges from −0.090 mm to 0.045 mm. FIG. 4B is a distortion diagram of the optical camera lens 10 in the second embodiment. As shown in FIG. 4B, the distortion in the optical camera lens 10 in the second embodiment ranges from −1.0% to 0%. FIG. 4C is a modulation transfer function diagram of the optical camera lens 10 in the second embodiment. As shown in FIG. 4C, the spatial frequency in the optical camera lens 10 in the second embodiment ranges from 0 lp/mm to 156 lp/mm, and the modulation transfer function in the optical camera lens 10 in the second embodiment ranges from 0.4 to 1.0.

Therefore, in this embodiment, the field curvature and the distortion in the optical camera lens 10 can be effectively corrected, and the requirement of the camera lens resolution can be met, so that the high optical performance can be obtained.

Figure 5:
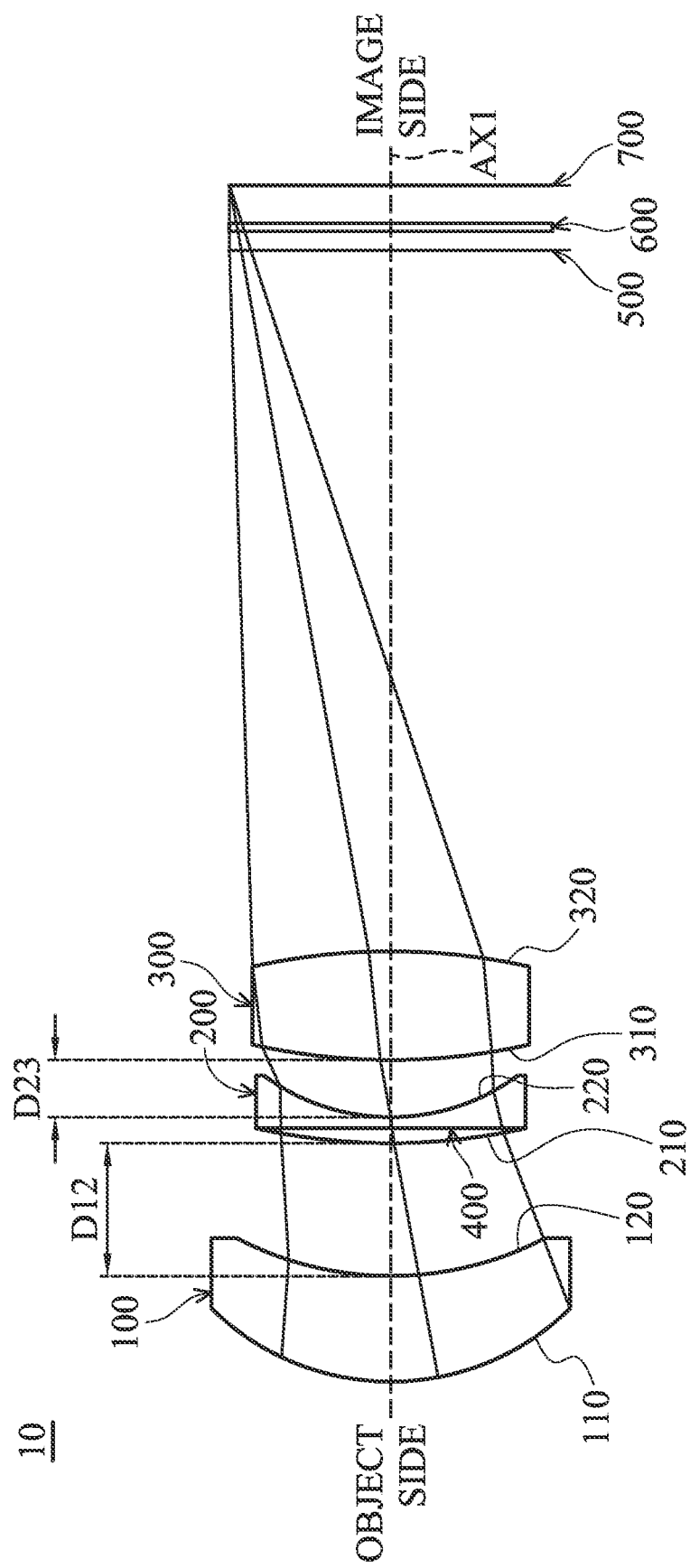
FIG. 5 is a schematic diagram of an optical camera lens according to a third embodiment of the invention.

FIG. 5 is a schematic diagram of an optical camera lens 10 according to a third embodiment of the invention. Referring to FIG. 5, the optical camera lens 10 includes a first lens 100, an aperture 400, a second lens 200, a third lens 300, a light path adjusting member 500, a filter 600, and an image sensor 700 from the object side to the image side along the optical axis AX1 in sequence. The light from the object side can pass the first lens 100, the second lens 200, the third lens 300, the light path adjusting member 500, and the filter 600 in sequence and reach the image sensor 700, and form an image on the image sensor 700. In the third embodiment, the first lens 100, the second lens 200, and the third lens 300 have a positive refractive power, a negative refractive power, and a positive refractive power, respectively. The shapes of the first lens 100, the second lens 200 and the third lens 300 in the third embodiment are similar to those in the first embodiment, and the description of the features thereof are not repeated in the interest of brevity. Table 5 shows related parameters of the lenses of the optical camera lens 10 in FIG. 5.

TABLE 5

| Effective focal length = 29.91 mm | | | | F-Number = 3.23 | | |
| Total length = 34.06 mm | | | | Field of view = 15.23 degree | | |

| Surface number | Radius of curvature (mm) | Thickness (mm) | Refractive index | Focal length (mm) | Abbe number | Remarks |
| --- | --- | --- | --- | --- | --- | --- |
| 110 | 6.858022 | 2.803188 | 1.517708 | 28.862 | 70.06 | first lens |
| 120 | 10.90851 | 3.878756 | | | | 100 |
| | ∞ | −0.3591613 | | | | aperture 400 |
| 210 | 12.11689 | 0.5889545 | 1.714355 | −10.263 | 29.66 | second lens |
| 220 | 4.475316 | 1.589525 | | | | 200 |
| 310 | 14.49706 | 2.840325 | 1.799963 | 11.482 | 45.22 | third lens |
| 320 | −22.88848 | 21 | | | | 300 |
| | ∞ | 0 | 1.740005 | | 28.29 | light path adjusting member 500 |
| | ∞ | 0.5 | | | | |
| | ∞ | 0.21 | 1.5168 | | 64.16 | filter 600 |
| | ∞ | 1.014788 | | | | |

Table 6 is the related parameters about aspheric coefficients of each aspheric surface of each of the lenses in Table 5.

TABLE 6

| Surface number | k | A<br>E | B<br>F | C<br>G | D |
|---|---|---|---|---|---|
| 110 | −0.03946648 | 1.7000722e−005<br>1.0981437e−010 | 1.7249425e−005<br>3.1404728e−011 | −5.5618727e−007<br>−1.0413771e−012 | −6.6457359e−010 |
| 120 | 3.694193 | 0.00013943765<br>3.2615007e−009 | 3.7477721e−005<br>3.5459535e−010 | −1.9330749e−006<br>−1.6881236e−011 | −1.0003944e−007 |
| 210 | 8.880988 | −0.00045300854<br>2.4263942e−008 | −0.00011885351<br>8.5356289e−009 | −9.7967292e−008<br>−5.377681e−010 | −7.1497375e−007 |
| 220 | 0.4414326 | −0.0010139096<br>−3.3836749e−009 | −0.00019773937<br>3.0385821e−008 | −4.7842632e−006<br>−1.8859531e−009 | −1.2916764e−006 |
| 310 | −3.258818 | 7.7552348e−005<br>1.4430964e−008 | −5.9395631e−006<br>3.1127109e−009 | 1.5393411e−007<br>−1.3304317e−010 | −4.7258467e−007 |
| 320 | −11.16884 | −0.00060492611<br>8.4174502e−009 | 1.0498349e−005<br>−8.0006417e−010 | −3.101857e−006<br>2.5586365e−011 | 9.4937349e−008 |

In this embodiment, the optical camera lens 10 can meet at least one of the aforementioned formulas (1)-(11), so as to increase the pixel resolution quality of the optical camera lens and achieve the purpose of convenient processing. Especially when the optical camera lens 10 applied in the electronic device, such as the movable terminal device, the cellphone, or the tablet computer, it can increase the back focal length of the optical camera lens without increasing the dimensions, the volume, and the thickness of the camera lens, and the optical camera lens 10 can include high magnification optical zoom.

In the third embodiment, the effective focal length f is 29.91 mm, and the effective focal length f2 of the second lens 200 is −10.263 mm. Therefore, f/f2 in formula (1) is −2.914.

The radius of curvature of the second object side surface 210 is 12.11689 mm, and the radius of curvature of the second image side surface 220 is 4.475316 mm. Therefore, R21/R22 in formula (2) is 2.707.

The total length of the optical camera lens 10 is 34.06 mm, and the back focal length of the optical camera lens 10 is 22.72 mm. Therefore, TTL/BFL in formula (3) is 1.499.

The effective focal length f1 of the first lens 100 is 28.862 mm, and the effective focal length f2 of the second lens 200 is −10.263 mm. Therefore, f1+f2 in formula (4) is 18.598 mm.

The back focal length of the optical camera lens 10 is 22.72 mm, the air gap D12 between the first image side surface 120 of the first lens 100 and the second object side surface 210 of the second lens 200 along the optical axis AX1 is 3.879 mm, and the air gap D23 between the second image side surface 220 of the second lens 200 and the third object side surface 310 of the third lens 300 along the optical axis AX1 is 1.59 mm. AAG is 5.469 mm. Therefore, BFL/AAG in formula (5) is 4.154.

The back focal length of the optical camera lens 10 is 22.72 mm, and the thickness of the first lens 100 in the optical axis AX1 is 2.803 mm. Therefore, BFL/T1 in formula (6) is 8.105.

The effective focal length f is 29.91 mm, the effective diameter of the first lens 100 at the object side is 9.34 mm, the effective diameter of the second lens 200 at the object side is 7.028 mm, and the effective diameter of the third lens 300 at the object side is 7.069 mm. Therefore, f/ALOD in formula (7) is 1.276.

The back focal length of the optical camera lens 10 is 22.72 mm, and the effective diameter of the third lens 300 at the object side is 7.069 mm. Therefore, BFL/OD3 in formula (8) is 3.214.

The effective focal length f is 29.91 mm, the back focal length of the optical camera lens 10 is 22.72 mm, and the effective diameter of the first lens 100 at the object side is 9.34 mm. Therefore, (f+BFL)/OD1 in formula (9) is 5.634.

The effective focal length f1 of the first lens 100 is 28.862 mm, and the back focal length of the optical camera lens 10 is 22.72 mm. Therefore, f1/BFL in formula (10) is 1.270.

The total length of the optical camera lens 10 is 34.06 mm, the effective focal length f is 29.91 mm, and the effective focal length f1 of the first lens 100 is 28.862 mm. Therefore, (TTL+f)/f1 in formula (11) is 2.216.

Similarly, the aspheric surface sag z of each of the lenses in the optical camera lens in the third embodiment is similar to that in the first embodiment, so that the features thereof are not repeated in the interest of brevity. Moreover, in the third embodiment, in the optical axis AX1, the distance between the second object side surface 210 and the first lens 100 is 0.3591613 mm smaller than the distance between the aperture 400 and the first lens 100.

Figure 6A:
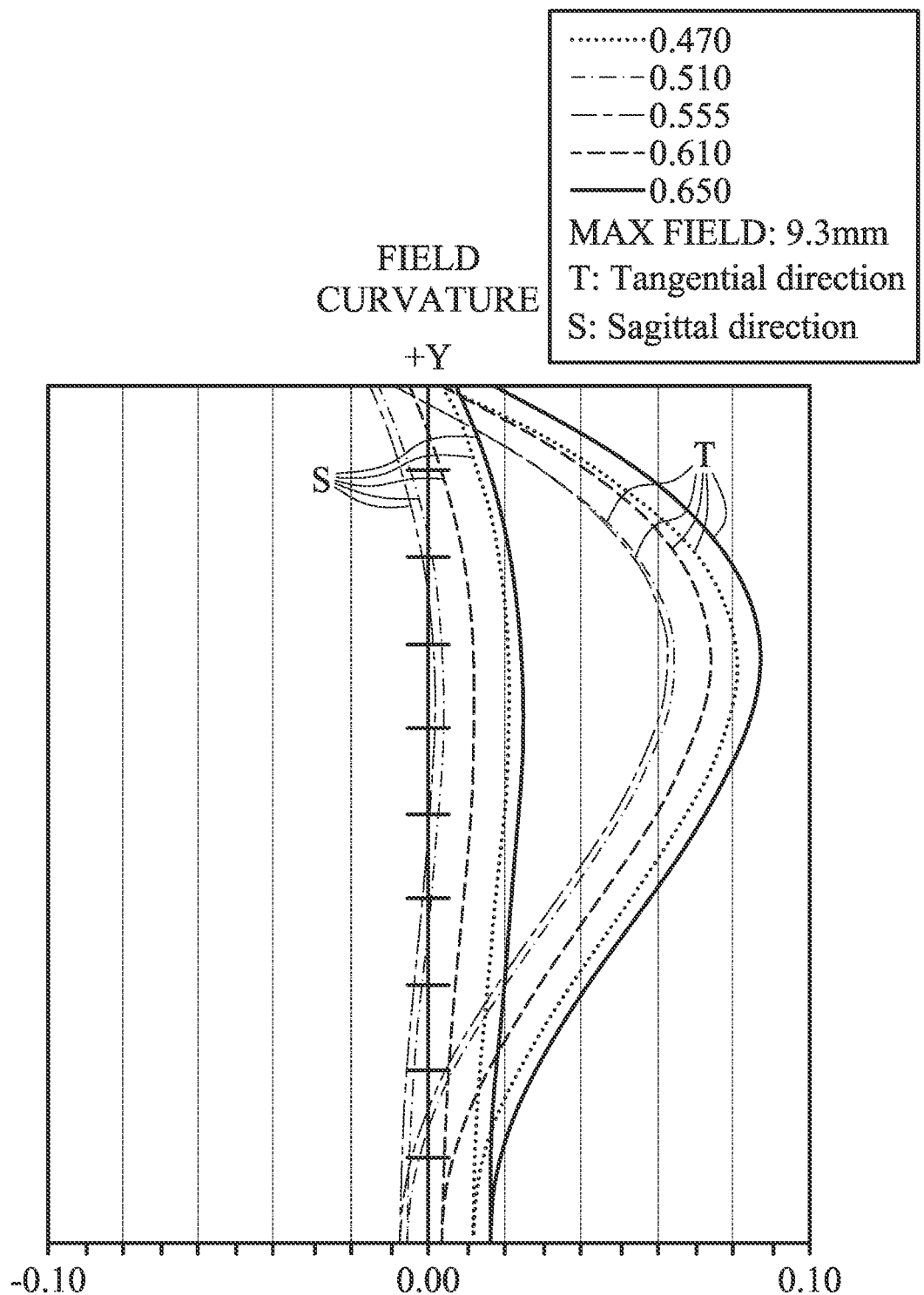
FIG. 6A is a field curvature diagram of the optical camera lens in the third embodiment.
Figure 6B:
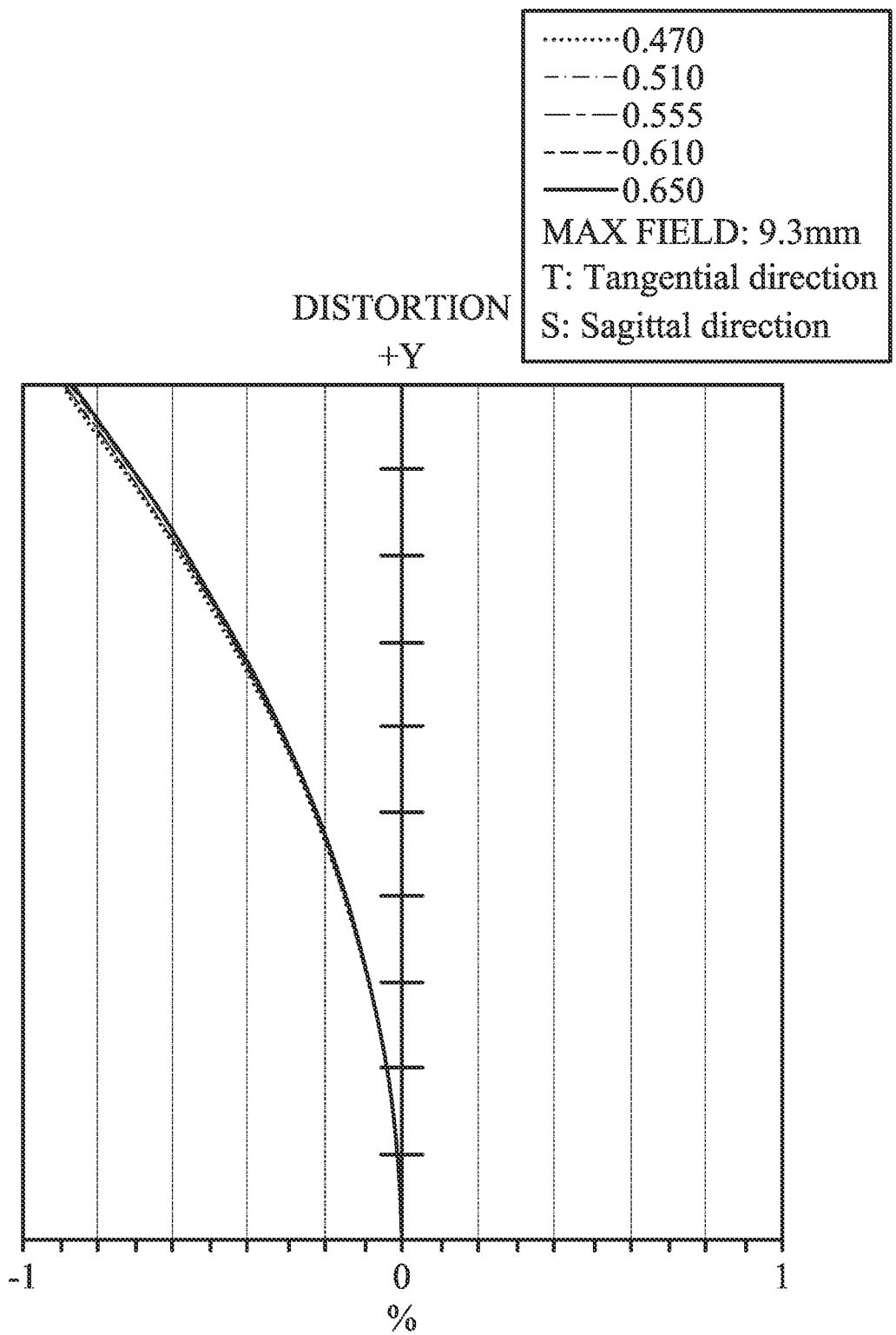
FIG. 6B is a distortion diagram of the optical camera lens in the third embodiment.
Figure 6C:
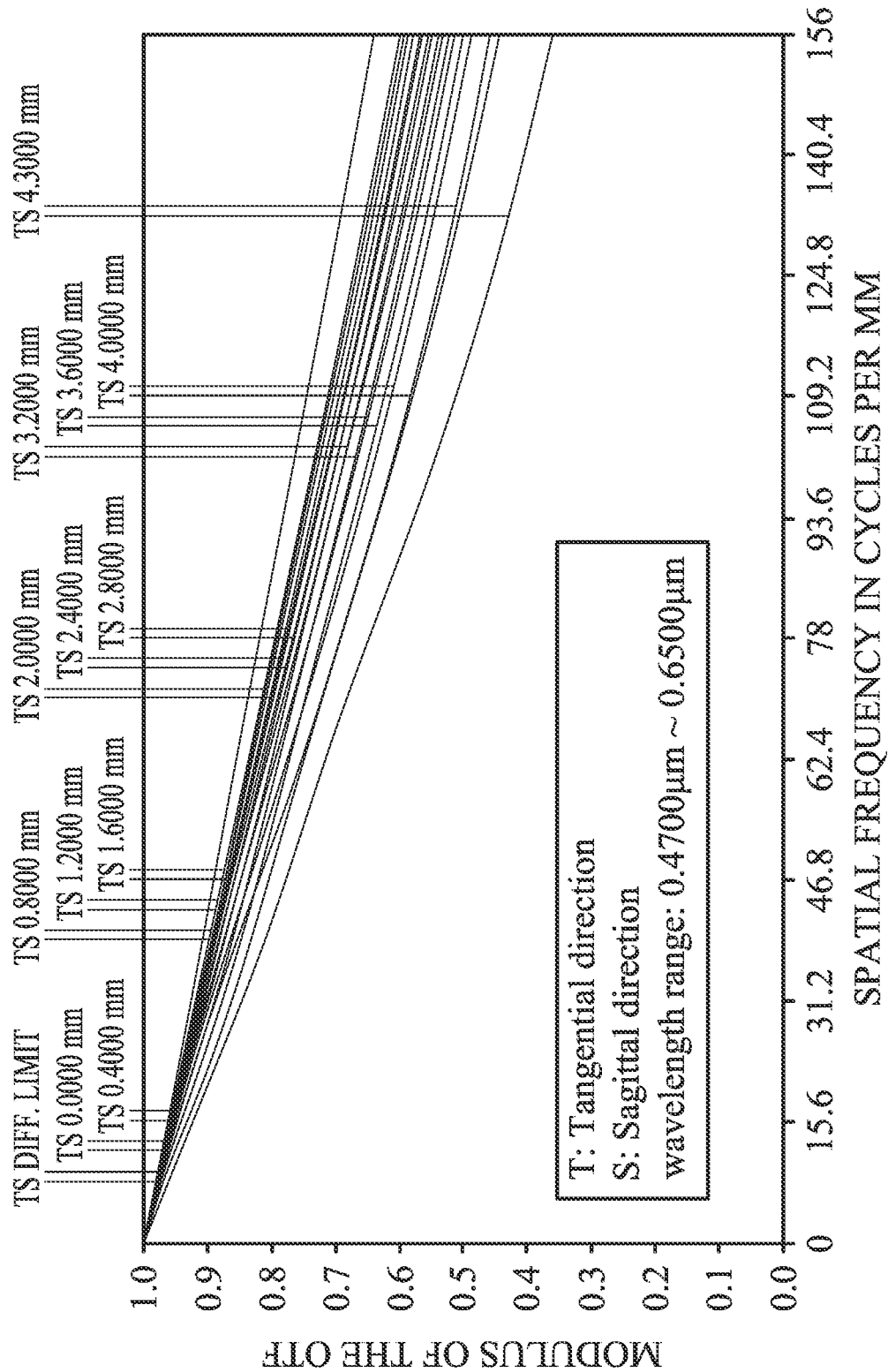
FIG. 6C is a modulation transfer function diagram of the optical camera lens in the third embodiment.

FIG. 6A is a field curvature diagram of the optical camera lens 10 in the third embodiment. As shown in FIG. 6A, the field curvature of the tangential direction and the sagittal direction in the optical camera lens 10 in the third embodiment ranges from −0.020 mm to 0.090 mm. FIG. 6B is a distortion diagram of the optical camera lens 10 in the third embodiment. As shown in FIG. 6B, the distortion in the optical camera lens 10 in the third embodiment ranges from −0.9% to 0%. FIG. 6C is a modulation transfer function diagram of the optical camera lens in the third embodiment. As shown in FIG. 6C, the spatial frequency in the optical camera lens 10 in the third embodiment ranges from 0 lp/mm to 156 lp/mm, and the modulation transfer function in the optical camera lens 10 in the third embodiment ranges from 0.3 to 1.0.

Therefore, in this embodiment, the field curvature and the distortion in the optical camera lens 10 can be effectively corrected, and the requirement of the camera lens resolution can be met, so that the high optical performance can be obtained.

Figure 7:
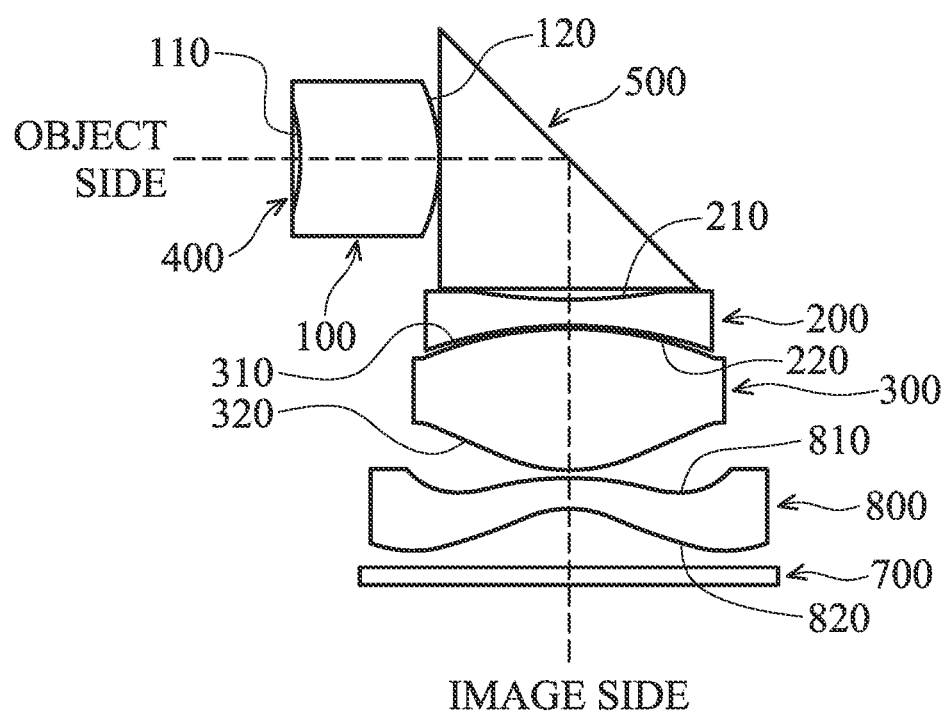
FIG. 7 is a schematic diagram of an optical camera lens according to a fourth embodiment of the invention.

FIG. 7 is a schematic diagram of an optical camera lens 10 according to a fourth embodiment of the invention. As shown in FIG. 7, the optical camera lens 10 includes an aperture 400, a first lens 100, a light path adjusting member 500, a second lens 200, a third lens 300, a fourth lens 800, and an image sensor 700 from the object side to the image side in sequence. The light from the object side can pass the aperture 400, the first lens 100, the light path adjusting member 500, the second lens 200, the third lens 300, and the fourth lens 800 in sequence and reach the image sensor 700, and form an image on the image sensor 700. In the fourth embodiment, the light path adjusting member takes a prism as an example but is not limited thereto. For example, the light path adjusting member may be a reflective mirror which only includes a reflective surface.

The first lens 100 is a meniscus lens with a positive refractive power, and includes a first object side surface 110 and a first image side surface 120. The first object side surface 110 is concave, and the first image side surface 120 is convex.

The second lens 200 is a biconcave lens with a negative refractive power, and side surface 210 is concave, and second image side surface 220 is concave.

The third lens 300 is a biconvex lens with a positive refractive power, and includes a third object side surface 310 and a third image side surface 320. The third object side surface 310 is convex, and the third image side surface 220 is convex too.

The fourth lens 800 is a meniscus lens with a negative refractive power, and includes a fourth object side surface 810 and a fourth image side surface 820. The fourth object side surface 810 includes a wave-shaped structure, and the fourth image side surface 820 includes another wave-shaped structure corresponding to the aforementioned wave-shaped structure. Specifically, the fourth object side surface 810 of the fourth lens 800 is convex in a paraxial region and the fourth image side surface 820 of the fourth lens 800 is concave in a paraxial region.

The aperture 400 is disposed between the object side and the first lens 100, and the light path adjusting member 500 is disposed between the first lens 100 and the second lens 200. The light path adjusting member 500 is a prism or a mirror, and is configured to adjust the moving direction of the light.

Table 7 is the related parameters of the lenses of the optical camera lens 10 in FIG. 7.

TABLE 7

| Effective focal length = 2.49 mm | | | F-Number = 2.48 | | | |
| Total length = 8.204 mm | | | Field of view = 38.78 degree | | | |

| Surface number | Radius of curvature (mm) | Thickness (mm) | Refractive index | Focal length (mm) | Abbe number | Remarks |
|---|---|---|---|---|---|---|
| | ∞ | 0.084321 | | | | aperture 400 |
| 110 | −2.54656 | 1.430805 | 1.85605 | 2.574 | 40.28 | first lens 100 |
| 120 | −1.491938 | 0.011211 | | | | |
| | ∞ | 2.606 | 2.003303 | | 28.31 | light path adjusting member 500 |
| | ∞ | 0.099877 | | | | |
| 210 | −2.505916 | 0.281861 | 1.651 | −2.513 | 19.24 | second lens 200 |
| 220 | 5.060772 | 0.023067 | | | | |
| 310 | 4.419570 | 1.421770 | 1.5352 | 1.96 | 56.11 | third lens 300 |
| 320 | −1.226325 | 0.012177 | | | | |
| 810 | 1.320806 | 0.291233 | 1.671 | −8.023 | 19.23 | fourth lens 800 |
| 820 | 0.967984 | 0.35 | | | | |
| | ∞ | 0.145 | 1.5 | | 60 | filter |
| | ∞ | 0.49729 | | | | |

In the fourth embodiment, the effective focal length f is 2.49 mm, and the effective focal length f2 of the second lens 200 is −2.513 mm. Therefore, f/f2 in formula (1) is −0.990.

The effective focal length f is 2.49 mm, the back focal length of the optical camera lens 10 is 0.992 mm, and the effective diameter of the first lens 100 at the object side is 1.023 mm. Therefore, (f+BFL)/OD1 in formula (9) is 3.403.

The effective focal length f1 of the first lens 100 is 2.574 mm, and the back focal length of the optical camera lens 10 is 0.992 mm. Therefore, f1/BFL in formula (10) is 2.594.

The total length of the optical camera lens 10 is 8.204 mm, the effective focal length f is 2.49 mm, and the effective focal length f1 of the first lens 100 is 2.574 mm. Therefore, (TTL+f)/f1 in formula (11) is 4.154.

The effective focal length f3 of the third lens 100 is 1.96, and the effective focal length f4 of the fourth lens 800 is −8.023. Therefore, f3/f4 in formula (12) is −0.2442.

The thickness of the first lens 100 is 1.43 mm, and the optical effective radius of the first lens 100 at the object side is 0.877 mm. Therefore, T1*L1SD in formula (13) is 1.2541 mm².

The thickness of the first lens 100 is 1.43 mm, and the radius of curvature of the first object side surface 110 of the first lens 100 is −2.54656 mm. Therefore, T1*R11 in formula (14) is −3.641 mm².

The effective focal length f1 of the first lens 100 is 2.574 mm, and the thickness of the first lens 100 is 1.43 mm. Therefore, f1/T1 in formula (15) is 1.8.

In this embodiment, the optical camera lens 10 can meet at least one of the formulas (1) and (9)-(15), so as to increase the pixel resolution quality of the optical camera lens and achieve the purpose of convenient processing. Especially when the optical camera lens 10 applied in the electronic device, such as the movable terminal device, the cellphone, or the tablet computer, it can increase the back focal length of the optical camera lens 10 without increasing the dimensions, the volume, and the thickness of the camera lens, and the optical camera lens 10 can include high magnification optical zoom.

The aspheric surface sag z of each of each aspheric lens in Table 7 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}.$$

In the aforementioned formula, c is curvature, h is the vertical distance from the lens surface to the optical axis, and k is conic constant. A, B, C, D, E, F, G, H, and I are aspheric coefficients.

Table 8 is the related parameters about aspheric coefficients of each aspheric surface of each of the lenses in Table 7.

TABLE 8

| Surface number | k | A E I | B F | C G | D H |
|---|---|---|---|---|---|
| 110 | 13.75141599 | 0.059633072<br>32.00738145<br>−8072.082431 | 0.197975902<br>−197.1765565 | −1.353695553<br>−516.6148698 | 6.011150013<br>4973.695118 |
| 120 | 0.84451503 | 0.075082368<br>−0.286249347<br>0.297002462 | 0.025370142<br>−0.896557483 | −0.078201244<br>2.03681989 | 0.373403036<br>−1.42041644 |
| 210 | 0.31567846 | −0.19884293<br>−0.01358974<br>−0.0011816 | 0.03114807<br>−0.0041441 | 0.03883311<br>0.003413 | −0.0023693<br>0.002526 |
| 220 | 11.50861688 | −0.04801084<br>−0.0014184<br>0.0001749 | −0.01774108<br>−0.001882 | 0.01732643<br>−0.00062629 | 0.009153<br>0.0002499 |
| 310 | −7.72515418 | −0.05136858<br>0.006072<br>0.0008936 | 0.02018952<br>0.005693 | −0.01897868<br>−0.0016121 | −0.006259<br>−0.0024039 |
| 320 | −3.31646464 | −0.02385783<br>−0.00056687<br>0.0001142 | 0.02126333<br>−0.000065107 | −0.00022589<br>−0.00032328 | −0.0031994<br>−0.00011925 |
| 810 | −1.10491344 | 0.19171951<br>−0.00054874<br>−0.000021294 | 0.02421953<br>0.0002613 | −0.01275306<br>0.0001886 | −0.0037512<br>0.00002875 |
| 820 | −2.37610553 | 0.20702235<br>0.0005286<br>0.000003042 | −0.03961328<br>−0.00002298 | −0.0069432<br>−0.000038561 | 0.001398<br>−4.8794e−06 |

Figure 8A:
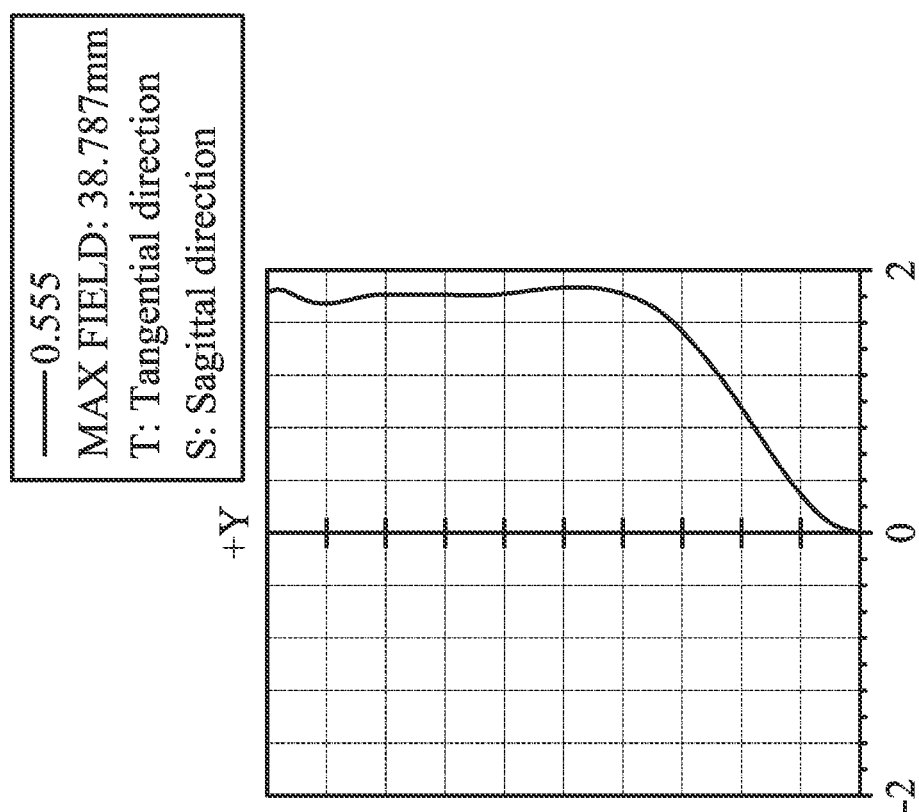
FIG. 8A is a field curvature diagram of the optical camera lens in the fourth embodiment.
Figure 8B:
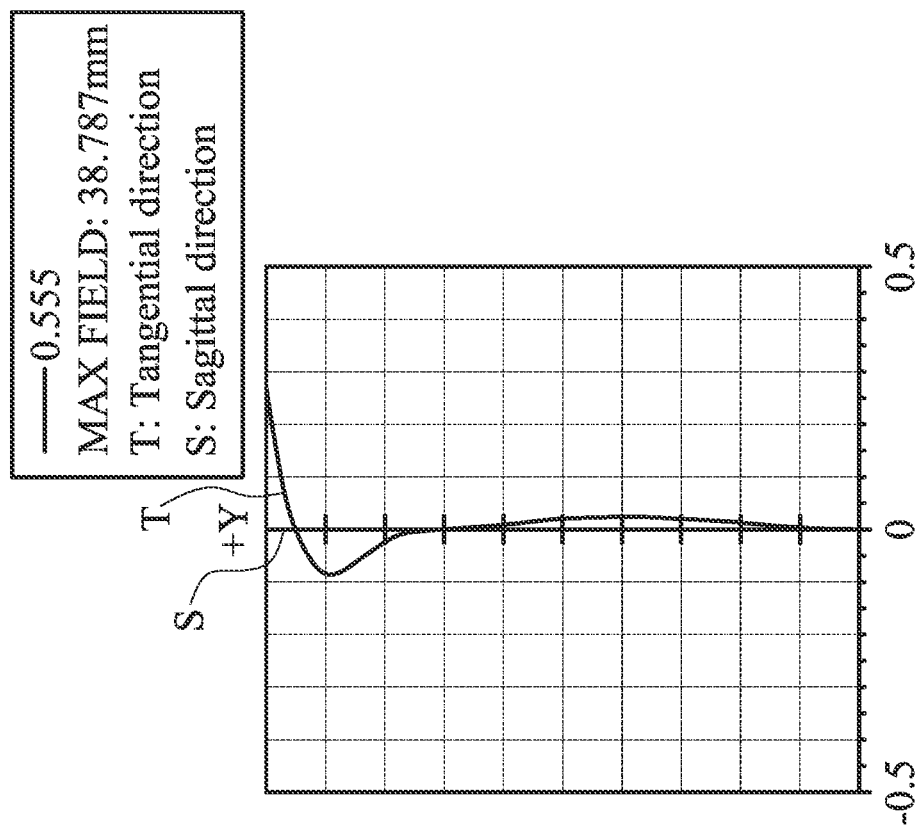
FIG. 8B is a distortion diagram of the optical camera lens in the fourth embodiment.
Figure 8C:
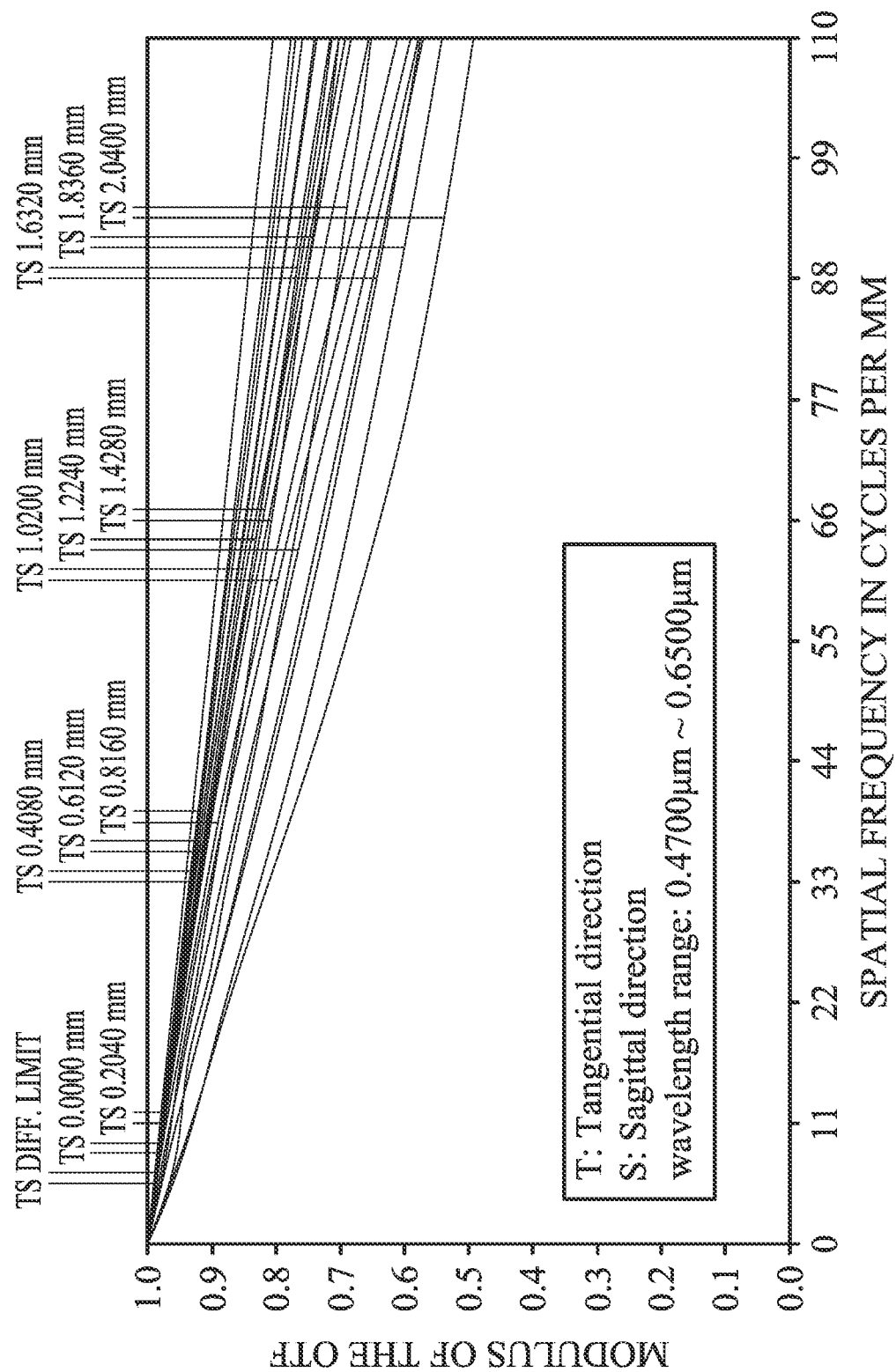
FIG. 8C is a modulation transfer function diagram of the optical camera lens in the fourth embodiment.

FIG. 8A is a field curvature diagram of the optical camera lens 10 in the fourth embodiment. As shown in FIG. 8A, the field curvature of the tangential direction and the sagittal direction in the optical camera lens 10 in the fourth embodiment ranges from −0.10 mm to 0.30 mm. FIG. 8B is a distortion diagram of the optical camera lens 10 in the fourth embodiment. As shown in FIG. 8B, the distortion in the optical camera lens 10 in the fourth embodiment ranges from 0% to 1.9%. FIG. 8C is a modulation transfer function diagram of the optical camera lens in the fourth embodiment. As shown in FIG. 8C, the spatial frequency in the optical camera lens 10 in the fourth embodiment ranges from 0 lp/mm to 110 lp/mm, and the modulation transfer function in the optical camera lens 10 in the fourth embodiment ranges from 0.5 to 1.0.

Therefore, in this embodiment, the field curvature and the distortion in the optical camera lens 10 can be effectively corrected, and the requirement of the camera lens resolution can be met, so that the high optical performance can be obtained.

Figure 9:
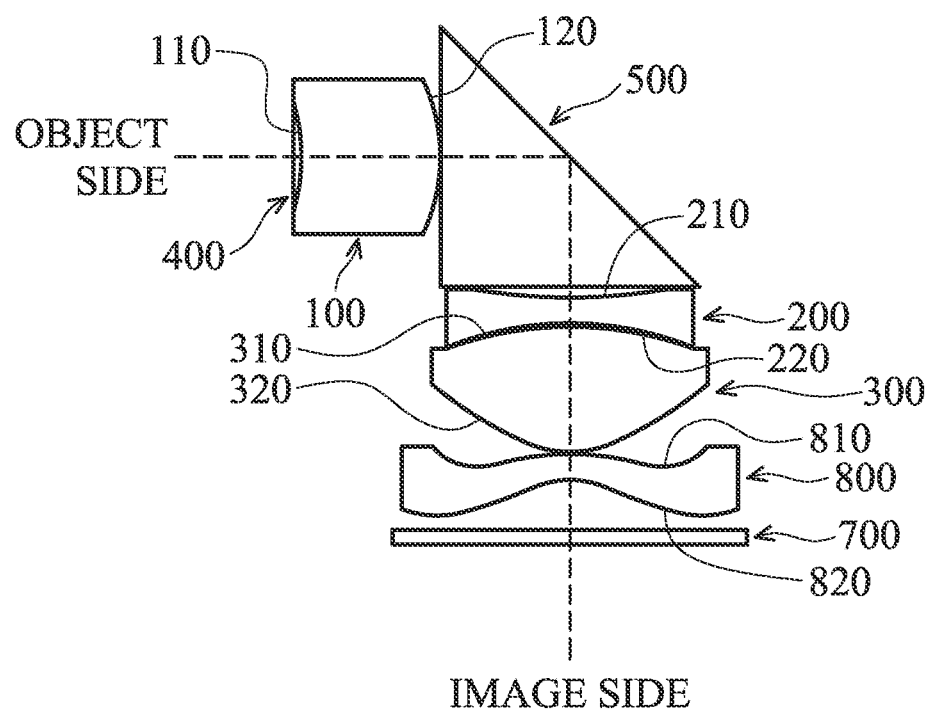
FIG. 9 is a schematic diagram of an optical camera lens according to a fifth embodiment of the invention.

FIG. 9 is a schematic diagram of an optical camera lens 10 according to a fifth embodiment of the invention. As shown in FIG. 9, the optical camera lens 10 includes an aperture 400, a first lens 100, a light path adjusting member 500, a second lens 200, a third lens 300, a fourth lens 800, and an image sensor 700 from the object side to the image side in sequence. The light from the object side can pass the aperture 400, the first lens 100, the light path adjusting member 500, the second lens 200, the third lens 300, and the fourth lens 800 in sequence and reach the image sensor 700, and form an image on the image sensor 700. In the fifth embodiment, the light path adjusting member takes a prism as an example but is not limited thereto. For example, the light path adjusting member may be a reflective mirror which only includes a reflective surface.

The first lens 100 is a meniscus lens with a positive refractive power, and includes a first object side surface 110 and a first image side surface 120. The first object side surface 110 is concave, and the first image side surface 120 is convex.

The second lens 200 is a biconcave lens with a negative refractive power, and side surface 210 is concave, and the second image side surface 220 is concave.

The third lens 300 is a biconvex lens with a positive refractive power, and includes a third object side surface 310 and a third image side surface 320. The third object side surface 310 is convex, and the third image side surface 220 is convex too.

The fourth lens 800 is a meniscus lens with a negative refractive power, and includes a fourth object side surface 810 and a fourth image side surface 820. The fourth object side surface 810 includes a wave-shaped structure, and the fourth image side surface 820 includes another wave-shaped structure corresponding to the aforementioned wave-shaped structure. Specifically, the fourth object side surface 810 of the fourth lens 800 is convex in a paraxial region and the fourth image side surface 820 of the fourth lens 800 is concave in a paraxial region.

The aperture 400 is disposed between the object side and the first lens 100, and the light path adjusting member 500 is disposed between the first lens 100 and the second lens 200. The light path adjusting member 500 is a prism or a mirror, and is configured to adjust the moving direction of the light.

Table 9 is the related parameters of the lenses of the optical camera lens 10 in FIG. 9.

TABLE 9

| Effective focal length = 2.688 mm | | | F-Number = 2.48 | | | |
|---|---|---|---|---|---|---|
| Total length = 7.944 mm | | | Field of view = 37.15 degree | | | |
| Surface number | Radius of curvature (mm) | Thickness (mm) | Refractive index | Focal length (mm) | Abbe number | Remarks |
| | ∞ | 0.111651 | | | | aperture 400 |
| 110 | −2.176831 | 0.861725 | 1.85605 | 2.936 | 40.28 | first lens 100 |
| 120 | 1.382900 | 0.011816 | | | | |
| | ∞ | 3.023 | 2.003303 | | 28.31 | light path adjusting member 500 |
| | ∞ | 0.1053 | | | | |
| 210 | −3.3371 | 0.2971 | 1.651 | −2.58 | 19.24 | second lens 200 |
| 220 | 3.5698 | 0.0243 | | | | |
| 310 | 3.2047 | 1.4424 | 1.5352 | 1.537 | 56.11 | third lens 300 |
| 320 | −0.9372 | 0.0128 | | | | |
| 810 | 1.2686 | 0.307 | 1.671 | −2.8044 | 19.23 | fourth lens 800 |
| 820 | 0.6863 | 0.4689 | | | | filter |
| | | 0.145 | | | | |
| | | 0.17942 | | | | |

In the fifth embodiment, the effective focal length f is 2.688 mm, and the effective focal length f2 of the second lens 200 is −2.58 mm. Therefore, f/f2 in formula (1) is −1.041.

The effective focal length f is 2.688 mm, the back focal length of the optical camera lens 10 is 0.793 mm, and the effective diameter of the first lens 100 at the object side is 1.122 mm. Therefore, (f+BFL)/OD1 in formula (9) is 3.102.

The effective focal length f1 of the first lens 100 is 2.936 mm, and the back focal length of the optical camera lens 10 is 0.793 mm. Therefore, f1/BFL in formula (10) is 3.702.

The total length of the optical camera lens 10 is 7.944 mm, the effective focal length f is 2.688 mm, and the effective focal length f1 of the first lens 100 is 2.936 mm. Therefore, (TTL+f)/f1 in formula (11) is 3.621.

The effective focal length f3 of the third lens 100 is 1.537, and the effective focal length f4 of the fourth lens 800 is −2.8044. Therefore, f3/f4 in formula (12) is −0.5480.

The thickness of the first lens 100 is 0.862 mm, and the optical effective radius of the first lens 100 at the object side is 0.67 mm. Therefore, T1*L1SD in formula (13) is 0.5775 mm$^2$.

The thickness of the first lens 100 is 0.862 mm, and the radius of curvature of the first object side surface 110 of the first lens 100 is −2.54656 mm. Therefore, T1*R11 in formula (14) is −2.195 mm$^2$.

The effective focal length f1 of the first lens 100 is 2.936 mm, and the thickness of the first lens 100 is 0.862 mm. Therefore, f1/T1 in formula (15) is 3.406.

In this embodiment, the optical camera lens 10 can meet at least one of the formulas (1) and (9)-(15), so as to increase the pixel resolution quality of the optical camera lens and achieve the purpose of convenient processing. Especially when the optical camera lens 10 applied in the electronic device, such as the movable terminal device, the cellphone, or the tablet computer, it can increase the back focal length of the optical camera lens 10 without increasing the dimensions, the volume, and the thickness of the camera lens, and the optical camera lens 10 can include high magnification optical zoom.

The aspheric surface sag z of each of each aspheric lens in Table 9 can be calculated by the following formula:

$$z = ch^2/\{1+[1-(k+1)c^2h^2]^{1/2}\}+Ah^2+Bh^4+Ch^6+Dh^8+Eh^{10}+Fh^{12}+Gh^{14}+Hh^{16}+Ih^{18}+Jh^{20}.$$

In the aforementioned formula, c is curvature, h is the vertical distance from the lens surface to the optical axis, and k is conic constant. A, B, C, D, E, F, G, H, I, and J are aspheric coefficients.

Table 10 is the related parameters about aspheric coefficients of each aspheric surface of each of the lenses in Table 9.

TABLE 10

| Surface number | k | A<br>E<br>I | B<br>F<br>J | C<br>G | D<br>H |
|---|---|---|---|---|---|
| 110 | 12.37051391 | 0<br>−3.704327987<br>3076.709194 | 0.048262563<br>69.06398288<br>−2494.305293 | 0.389555332<br>−78.86702201 | −1.145030981<br>−873.1214579 |
| 120 | 0.99778611 | 0<br>0.391873143<br>−0.957068478 | 0.04991879<br>−0.055996169<br>−2.717302478 | 0.080225825<br>−0.897002003 | −0.189381455<br>2.39169789 |
| 210 | 2.31602371 | 0<br>0.0136<br>0.0019887 | −0.0685<br>−0.0064636<br>−0.00058658 | −0.0332<br>−0.0057684 | 0.0216<br>0.00085384 |
| 220 | −0.65582791 | 0<br>0.0073692<br>−0.00026251 | 0.0424<br>0.0029372<br>0.00017107 | −0.0359<br>−0.000059262 | −0.006035<br>−0.00091777 |
| 310 | −23.3047003 | 0<br>−0.0087938<br>−0.001833 | −0.0221<br>0.0030024<br>0.00048667 | 0.027<br>0.0056237 | −0.0186<br>−0.00037447 |

TABLE 10-continued

| Surface number | k | A E I | B F J | C G | D H |
|---|---|---|---|---|---|
| 320 | -3.44256857 | 0.0261<br>-0.0038854<br>0.0002905 | -0.0236<br>-0.0038854<br>-0.00010395 | 0.0207<br>-0.00062128 | -0.00061085<br>0.00048696 |
| 810 | -8.14831677 | 0<br>0.00092888<br>0.000021087 | 0.0877<br>-0.00090514<br>-0.000020786 | -0.00088187<br>0.00028164 | -0.0078454<br>0.00019802 |
| 820 | -3.6802442 | 0<br>0.00092888<br>2.2467e-06 | 0.0877<br>0.00038536<br>-1.005e-07 | -0.00088187<br>-0.000055828 | -0.0078454<br>-0.000010893 |

Figure 10B:
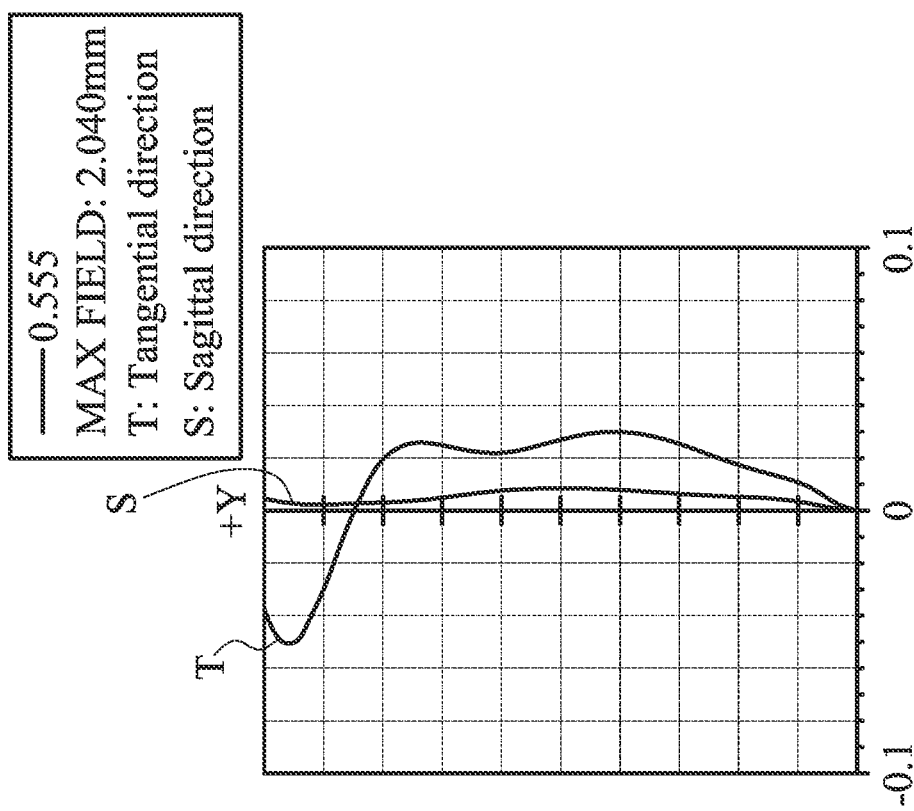
FIG. 10B is a distortion diagram of the optical camera lens in the fifth embodiment.
Figure 10A:
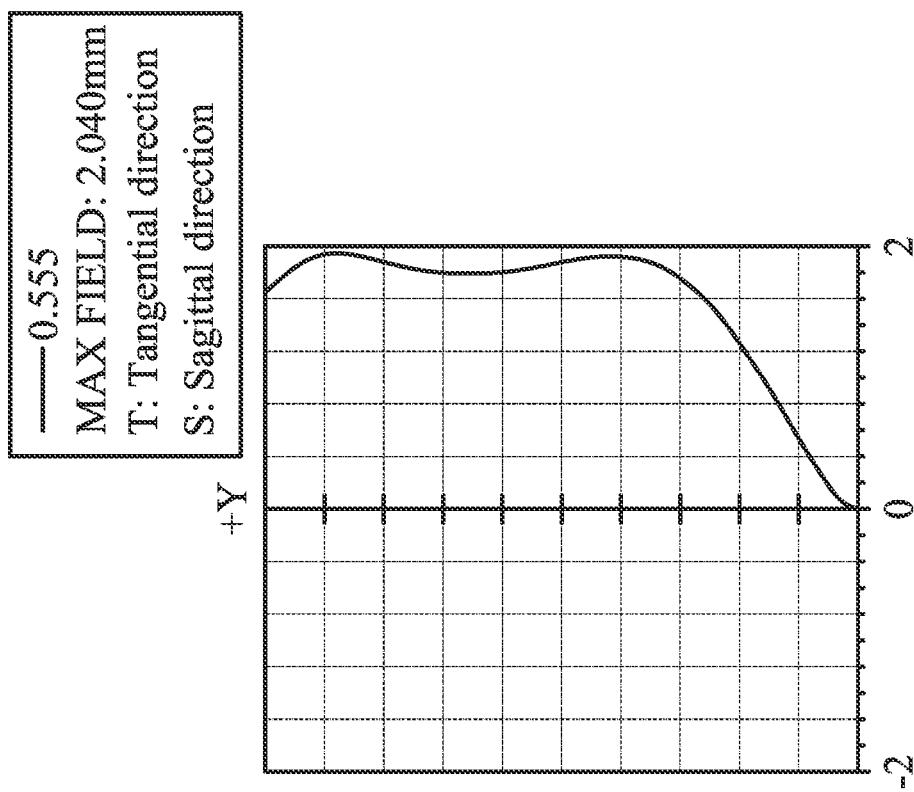
FIG. 10A is a field curvature diagram of the optical camera lens in the fifth embodiment.
Figure 10C:
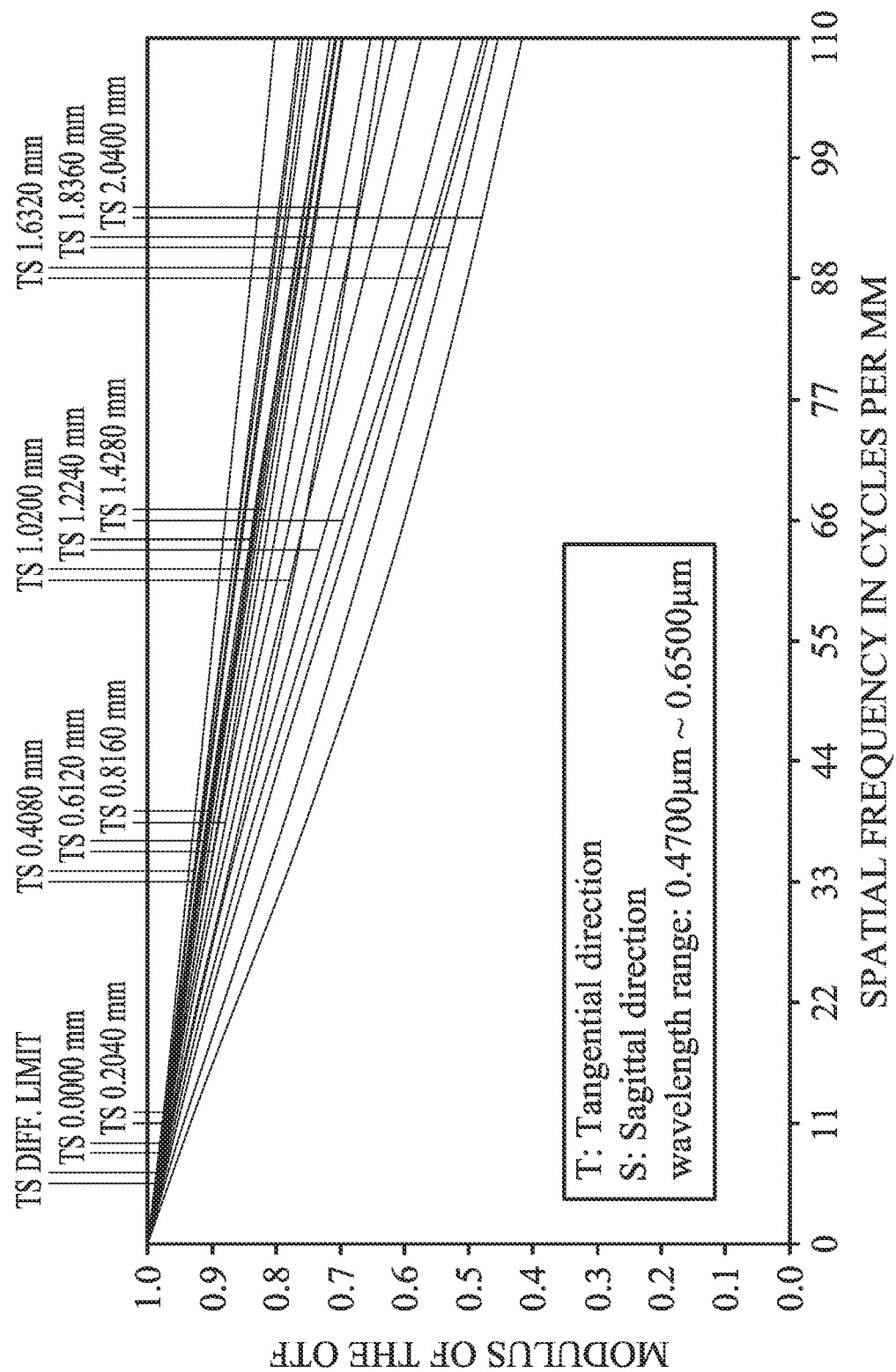
FIG. 10C is a modulation transfer function diagram of the optical camera lens in the fifth embodiment.

FIG. 10A is a field curvature diagram of the optical camera lens 10 in the fifth embodiment. As shown in FIG. 10A, the field curvature of the tangential direction and the sagittal direction in the optical camera lens 10 in the fifth embodiment ranges from -0.05 mm to 0.03 mm. FIG. 10B is a distortion diagram of the optical camera lens 10 in the fifth embodiment. As shown in FIG. 10B, the distortion in the optical camera lens 10 in the fifth embodiment ranges from 0% to 2.0%. FIG. 10C is a modulation transfer function diagram of the optical camera lens 10 in the fifth embodiment. As shown in FIG. 10C, the spatial frequency in the optical camera lens 10 in the fifth embodiment ranges from 0 lp/mm to 110 lp/mm, and the modulation transfer function in the optical camera lens 10 in the fifth embodiment ranges from 0.4 to 1.0.

Therefore, in this embodiment, the field curvature and the distortion in the optical camera lens 10 can be effectively corrected, and the requirement of the camera lens resolution can be met, so that the high optical performance can be obtained.

In summary, the optical camera lens in this invention includes high optical performance, the pixel resolution quality can be enhanced, and the purpose of convenient processing can be achieved.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical camera lens, comprising:
a first lens is a meniscus lens with positive refractive power and comprising a first object side surface and a first image side surface, wherein the first object side surface is opposite to the first image side surface;
a second lens is with negative refractive power and comprising a second object side surface and a second image side surface, wherein the second object side surface is opposite to the second image side surface, the second object side surface is convex, and the second image side surface is concave; and
a third lens is with positive refractive power and comprising a third object side surface and a third image side surface, wherein the third object side surface is opposite to the third image side surface, the third object side surface is convex, and the third image side surface is convex;

wherein the first lens, the second lens, and the third lens are arranged from an object side to an image side in sequence, and the optical camera lens satisfies the following condition:

$2.5 < R21/R22 < 3$, wherein R21 is the radius of curvature of the second object side surface and R22 is the radius of curvature of the second image side surface;

$6 < BFL/T1 < 11$, wherein BFL is the back focal length of the optical camera lens and T1 is the thickness of the first lens; and $3.5 < BFL/AAG < 5.5$, wherein AAG is the sum of the air gap between the first lens and the second lens and the air gap between the second lens and the third lens.

2. The optical camera lens as claimed in claim 1, wherein the first object side surface is convex and the first image side surface is concave.

3. The optical camera lens as claimed in claim 2, wherein the optical camera lens satisfies the following condition:

$0 < TTL/BFL < 2$, wherein TTL is the total length of the optical camera lens.

4. The optical camera lens as claimed in claim 2, wherein the optical camera lens satisfies the following condition:

$0 < f1/BFL < 4.5$, wherein f1 is the effective focal length of the first lens.

5. The optical camera lens as claimed in claim 2, wherein the optical camera lens satisfies the following condition:

$1 < f/ALOD < 2.3$, wherein f is the effective focal length of the optical camera lens, and ALOD is the sum of the effective diameter of the first lens at the object side, the effective diameter of the second lens at the object side, and the effective diameter of the third lens at the object side.

6. The optical camera lens as claimed in claim 1, wherein the optical camera lens satisfies the following condition:

$1 < (TTL+f)/f1 < 5$, wherein f is the effective focal length of the optical camera lens, TTL is the total length of the optical camera lens, and f1 is the effective focal length of the first lens.

7. The optical camera lens as claimed in claim 6, wherein the optical camera lens satisfies at least one of the following conditions:

$-3.5 < f/f2 < 0$;

$16 \text{ mm} < f1+f2 < 21 \text{ mm}$;

wherein f is the effective focal length of the optical camera lens, f1 is the effective focal length of the first lens, and f2 is the effective focal length of the second lens.

8. The optical camera lens as claimed in claim 1, wherein the optical camera lens satisfies the following condition:

1<BFL/OD3<5, wherein OD3 is the effective diameter of the third lens at the object side.

9. The optical camera lens as claimed in claim 1, wherein the optical camera lens satisfies the following condition:

2<(f+BFL)/OD1<7, wherein f is the effective focal length of the optical camera lens, and OD1 is the effective diameter of the first lens at the object side.

10. The optical camera lens as claimed in claim 1, further comprising a first light path adjusting member disposed between the first lens and image side, wherein the first light path adjusting member is a prism or reflective mirror.

11. The optical camera lens as claimed in claim 10, further comprising a second light path adjusting member disposed between the object side and the first lens, wherein the second light path adjusting member is a prism or reflective mirror.

12. An optical camera lens, comprising:
a first lens is a meniscus lens with positive refractive power and comprising a first object side surface and a first image side surface, wherein the first object side surface is opposite to the first image side surface;
a second lens with negative refractive power and comprising a second object side surface and a second image side surface, wherein the second object side surface is opposite to the second image side surface, and the second image side surface is concave; and
a third lens with positive refractive power and comprising a third object side surface and a third image side surface, wherein the third object side surface is opposite to the third image side surface, the third object side surface is convex, and the third image side surface is convex;
wherein the first lens, the second lens, and the third lens are arranged from the object side to the image side in sequence, and the optical camera lens satisfies the following condition:

16 mm<f1+f2<21 mm;

25<R21/R22<3; and

6<BFL/T1<11, wherein f1 is the effective focal length of the first lens, f2 is the effective focal length of the second lens, R21 is the radius of curvature of the second object side surface, R22 is the radius of curvature of the second image side surface, BFL is the back focal length of the optical camera lens, and T1 is the thickness of the first lens.

13. The optical camera lens as claimed in claim 12, wherein the first object side surface is convex and the first image side surface is concave;
the second object side surface is convex.

* * * * *